United States Patent
Neuer, III et al.

(10) Patent No.: US 9,203,964 B1
(45) Date of Patent: *Dec. 1, 2015

(54) PROVIDING COMPLIANCE ENFORCEMENT FOR MANUALLY DIALED WIRELESS NUMBERS IN A CONTACT CENTER

(71) Applicant: Noble Systems Corporation, Atlanta, GA (US)

(72) Inventors: Ellwood I. Neuer, III, Newnan, GA (US); Chad Hitchcock, Johns Creek, GA (US)

(73) Assignee: Noble Systems Corporation, Atlanta, GA (US)

( * ) Notice: Subject to any disclaimer, the term of this patent is extended or adjusted under 35 U.S.C. 154(b) by 72 days.

This patent is subject to a terminal disclaimer.

(21) Appl. No.: 14/246,210

(22) Filed: Apr. 7, 2014

Related U.S. Application Data

(63) Continuation of application No. 13/902,130, filed on May 24, 2013, now Pat. No. 8,738,076.

(60) Provisional application No. 61/813,713, filed on Apr. 19, 2013.

(51) Int. Cl.
*H04M 1/00* (2006.01)
*H04M 3/51* (2006.01)

(52) U.S. Cl.
CPC .................................. *H04M 3/5175* (2013.01)

(58) Field of Classification Search
USPC ........ 455/415–416, 554.2, 555, 556.1, 556.2, 455/557
See application file for complete search history.

(56) References Cited

U.S. PATENT DOCUMENTS

| | | |
|---|---|---|
| 5,850,433 A | 12/1998 | Rondeau |
| 6,198,814 B1 | 3/2001 | Gill |
| 6,621,900 B1 | 9/2003 | Rice |
| 7,167,547 B2 * | 1/2007 | Stillman et al. ............ 379/88.23 |
| 7,783,290 B2 | 8/2010 | Kim |
| 8,606,245 B1 | 12/2013 | Eccelston et al. |
| 8,712,032 B1 | 4/2014 | Leary, II et al. |
| 2002/0176405 A1 | 11/2002 | Aijala |
| 2003/0231750 A1 | 12/2003 | Janveja et al. |
| 2004/0042611 A1 | 3/2004 | Power et al. |
| 2004/0170258 A1 | 9/2004 | Levin et al. |
| 2004/0179672 A1 | 9/2004 | Pagel et al. |

(Continued)

OTHER PUBLICATIONS

Notice of Allowance Received for U.S. Appl. No. 13/958,011 dated Nov. 5, 2014.

(Continued)

*Primary Examiner* — Dai A Phuong

(57) ABSTRACT

Systems and methods are disclosed for originating a call to a wireless number by a contact center while enforcing various compliance requirements. In one embodiment, a compliance server and a PBX cooperate to originate the call to the wireless number. The agent logs into the compliance server and the compliance server provides the agent with a wireless number to dial. The agent manually enters the wireless number using a phone connected to the PBX. The PBX queries the compliance server regarding establishing the wireless call. Upon authorization, the PBX establishes a first call leg to the compliance server, and a second call leg to the called party that is joined with the call leg to the agent's phone. Upon completion of the call, the agent dispositions the call to the compliance server, which then releases the first call leg. In response, the PBX then releases the second call leg.

23 Claims, 11 Drawing Sheets

(56) References Cited

U.S. PATENT DOCUMENTS

| | | | |
|---|---|---|---|
| 2004/0198454 A1* | 10/2004 | Chavez | H04M 3/38 455/565 |
| 2005/0048967 A1 | 3/2005 | Hoglander et al. | |
| 2005/0232410 A1 | 10/2005 | Gonzalez | |
| 2006/0229093 A1* | 10/2006 | Bhutiani | H04W 4/10 455/518 |
| 2007/0015553 A1 | 1/2007 | Siddiqui | |
| 2008/0270279 A1 | 10/2008 | Rowe | |
| 2009/0003316 A1 | 1/2009 | Lee et al. | |
| 2010/0128862 A1* | 5/2010 | Vendrow | H04M 3/38 379/198 |
| 2011/0165858 A1* | 7/2011 | Gisby et al. | 455/411 |
| 2011/0211531 A1* | 9/2011 | Woodson | H04W 8/18 370/328 |
| 2012/0088475 A1 | 4/2012 | Portman et al. | |
| 2012/0124227 A1 | 5/2012 | Al-Khowaiter | |
| 2013/0065558 A1 | 3/2013 | Oneil et al. | |
| 2013/0143539 A1* | 6/2013 | Baccay et al. | 455/416 |
| 2013/0202101 A1 | 8/2013 | LaBoyteaux et al. | |
| 2013/0225235 A1* | 8/2013 | Elter | H04W 4/16 455/555 |
| 2013/0316677 A1* | 11/2013 | Aharon | H04W 12/02 455/411 |
| 2014/0016646 A1* | 1/2014 | Gallant et al. | 370/395.1 |
| 2014/0115486 A1 | 4/2014 | Benson et al. | |
| 2014/0126427 A1* | 5/2014 | Elizarov | H04L 69/28 370/259 |
| 2014/0133643 A1 | 5/2014 | Claudatos et al. | |
| 2015/0126203 A1* | 5/2015 | Silver | H04L 12/66 455/445 |

OTHER PUBLICATIONS

Noble Systems Corporation, Harmony Version 3.1 User Manual, May 9, 2013, 236 pages, Noble Systems Corporation, Atlanta, GA.

Office Action Received for U.S. Appl. No. 14/494,171 dated Dec. 1, 2014.

Office Action Received for U.S. Appl. No. 14/535,620 dated Dec. 31, 2014.

Noble Systems Corporation, Maestro 2010.1.1 Manual, vol. 4: IVR, Oct. 27, 2010, pp. 1-318, Noble Systems Corporation, Atlanta, GA.

Noble Systems Corporation, Maestro 2010.1.1 Manual, vol. 2, Aug. 3, 2010, 416 pages, Noble Systems Corporation, Atlanta GA.

Noble Systems Corporation, Maestro 2010.1.1 Manual, vol. 3: Reports, Aug. 18, 2010, 124 pages, Noble Systems Corporation, Atlanta, GA.

Noble Systems Corporation, Maestro 2010.1.1 Manual, vol. 1, Aug. 17, 2010, 454 pages, Noble Systems Corporation, Atlanta, GA.

Office Action received for U.S. Appl. No. 13/958,011 dated Dec. 13, 2013.

Office Action received for U.S. Appl. No. 13/958,011 dated Mar. 26, 2014.

Office Action received for U.S. Appl. No. 13/958,011 dated Jul. 17, 2014.

Notice of Allowance Received for U.S. Appl. No. 14/494,171 dated Feb. 18, 2015.

Notice of Allowance Received for U.S. Appl. No. 14/535,620 dated Feb. 9, 2015.

* cited by examiner

PROVIDING COMPLIANCE ENFORCEMENT FOR MANUALLY DIALED WIRELESS NUMBERS IN A CONTACT CENTER

RELATED APPLICATIONS

This application is a continuation of U.S. patent application Ser. No. 13/902,130 entitled "Providing Compliance Enforcement for Manually Dialed Wireless Numbers in a Contact Center," which was filed on May 24, 2013, and claims priority to provisional U.S. patent application No. 61/813,713 entitled "Compliance Enforcement for Manually Dialed Wireless Numbers in a Contact Center," which was filed on Apr. 19, 2013, in which the contents of both are incorporated by reference for all that they teach.

FIELD OF THE DISCLOSURE

The concepts and technologies disclosed herein generally pertain to enforcement of compliance requirements for calls directed to wireless telephone numbers wherein the calls are originated by agents in a contact center.

BACKGROUND OF THE INVENTION

The Telephone Consumer Protection Act ("TCPA") passed in 1991 regulates, in part, aspects of originating certain types of telephone calls. Specifically, the TCPA statute and Federal Communications Commission's ("FCC") regulations interpreting the TCPA prohibit the use of an "autodialer" to place calls to certain types of telephone numbers (simply referred to as "numbers" herein), including calls to any number "assigned to a paging service, cellular telephone service, specialized mobile radio service, or other radio common carrier service, or any service for which the called party is charged for the call." 47 U.S.C. §227(b) (1) (A); 47 C.F.R. §64.1200(a)(1). This covers what is commonly referred to as a "wireless number" that is assigned to a mobile phone. For simplicity, this term ("wireless number") is used herein to refer to numbers that cannot be called under the TCPA using an autodialer.

The FCC regulates aspects of the TCPA and has considered the scope of the term "autodialer." The TCPA and FCC's rules have defined an "automatic telephone dialing system" ("autodialer") as "equipment which has the capacity (A) to store or produce telephone numbers to be called, using a random or sequential number generator; and (B) to dial such numbers." U.S.C. §227(a) (1). At the time the statute was passed, dialers were frequently configured to originate calls by dialing a random telephone number or dialing telephone numbers in sequence (e.g., 404 555-0000 through 404 555-9999). Hence, the definition of an autodialer incorporated aspects of processing telephone numbers using a random or sequential number generator.

Over time, the FCC has interpreted the scope of an "autodialer" to include equipment that "need only have the capacity to store or produce telephone numbers." (See Rules and Regulations Implementing the Telephone Consumer Protection Act of 1991, Report and Order, 18 FCC Rcd. 14014 ¶133 (2003)). Coincident with this time period, predictive dialers were increasingly being used to originate calls to wireline numbers. Predictive dialers can originate calls using a list of numbers to be called with reduced agent waiting time. There is little debate that many predictive dialers do not use "random or sequential number generators." However, the FCC has classified predictive dialers as "autodialers" in certain instances to ensure that the prohibition on autodialed calls was not circumvented by automatically dialing "lists of numbers" instead of creating and dialing 10 digit telephone numbers arbitrarily. The FCC has viewed a basic function of an autodialer as equipment having the "capacity to dial numbers without human intervention." Id. ¶131. Thus, it appears that equipment having the capacity to dial number without human intervention may be an autodialer, regardless of whether such equipment is actually used in such a manner.

As can be expected, it is not always clear whether an equipment configuration is considered an "autodialer." Thus, the problem addressed by the present disclosure is ensuring that compliance related regulations and policies are adhered to while also complying with the mandate that prohibits the use of "autodialers" to call wireless numbers. It is against this backdrop that the concepts and technologies disclosed herein are presented.

SUMMARY

Various embodiments are disclosed for providing compliance enforcement in a contact center when an agent originates a call to a wireless number. In various embodiments, a compliance server and PBX cooperate to allow manual dialing by the agent using the PBX, while allowing the compliance server to ensure that various compliance regulations and/or policies are adhered to in conjunction with originating the wireless call. The compliance server is able to maintain status information associated with the agent and/or the wireless call, even though the compliance server itself does not originate the call.

In one embodiment, coordination is provided between the PBX and the compliance server so as to provide compliance enforcement when dialing a wireless number. The coordination may involve various types of signaling between the PBX and the compliance server. Specifically, in one embodiment, the compliance server provides compliance enforcement by responding to a query from the PBX regarding a call to a wireless number dialed by the agent. In other embodiments, coordination between the PBX and a compliance module occurs within a single processing system so as to provide compliance enforcement when dialing a wireless number.

As is discussed in greater detail below, the subject matter disclosed herein may be implemented as a computer-controlled apparatus, a method, a computing system, or as an article of manufacture such as a tangible, non-transitory computer-readable storage medium. These and various other features will be apparent from the following Detailed Description and the associated drawings.

This Summary is provided to exemplify concepts at a high level form that are further described below in the Detailed Description. This Summary is not intended to identify key or essential features of the claimed subject matter, nor is it intended that this Summary be used to limit the scope of the claimed subject matter. Furthermore, the claimed subject matter is not limited to implementations that address any or all disadvantages noted in any part of this disclosure.

DETAILED DESCRIPTION

Figure 1:
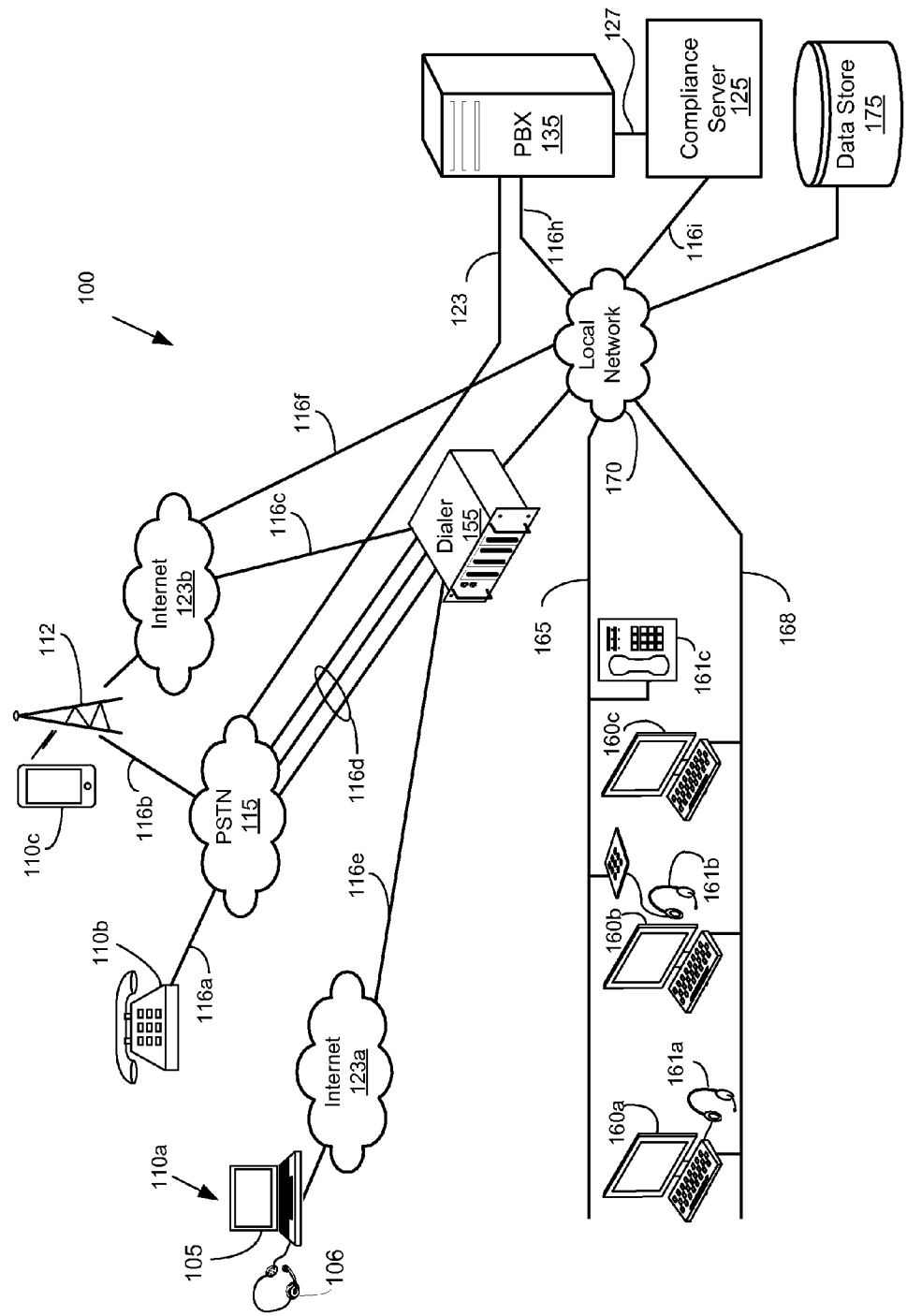
FIG. 1 illustrates one embodiment of a contact center architecture incorporating a compliance server providing compliance enforcement when an agent originates a call to a wireless number.

Predictive dialers are often used to generate calls by dialing a plurality of wireline telephone numbers with the expectation that many, if not most, calls will not be answered by the desired party. Many calls originated by the predictive dialer expect to be unanswered, answered by an answering machine, forwarded to a voice mail system, or disconnected. Other conditions may be encountered where the call is not answered by the desired party. Rather than consume an agent's time by originating calls in a serial manner and encountering the above conditions, the predictive dialer will dial a number of calls simultaneously. When a call is answered by a party, that call is connected to an agent who can then speak with the party. Thus, the agent has less wait time before talking to the right party. Predictive dialers allow the agent's time to be used with greater efficiency and offer many advantages over the agent manually dialing the call.

As with any technology, there is the possibility of misuse. Various regulations have been developed to ensure that contact center operators do not abuse the usage of predictive dialers thereby creating an unreasonable nuisance to the public. For example, when a predictive dialer determines that an agent is available, it can simultaneously generate a large number of outgoing calls using telephone numbers on a dialing list. The first call that is answered by a person may be connected to the available agent. However, if there are no other available agents, then the remaining calls that are answered will not be immediately connected to an agent. Under such circumstances, the predictive dialer may simply hang up when the called party answers or play an announcement asking the called party to wait for the next available agent. However, this practice is generally deemed undesirable and federal regulations may limit the abandonment rate of a contact center when operating a predictive dialer.

Another potential undesirable aspect involves re-dialing an abandoned call. In the above example, if a call is answered, but no agent is available, the predictive dialer may simply terminate the call. Thus, the called party may rush to answer the phone, only to hear silence. The number may be flagged by the predictive dialer as being unanswered and included in the next dialing attempt when the next agent is available. This process may be repeated a number of times during a day. Without any safeguards in place, it is possible to repeatedly call the same number and repeatedly hang up, further aggravating the called party. Even if the called party is not home, this mode of operation can result in the called party's caller-ID feature on their telephone to record a large number of consecutive call attempts by the predictive dialer. Such repeated call attempts by themselves may be deemed harassing, and may violate federal regulations in certain circumstances. In many instances, large fines may be assessed against the call center operator.

Thus, there are various compliance related aspects that must be enforced during a campaign when originating calls. As used herein, "compliance requirements" may include state regulatory requirements, federal regulatory requirements, contact center policies, or client requirements. Thus, a variety of restrictions or limitations on call origination may fall within the scope of compliance requirements.

Some of the compliance related aspects are described below, which include some of those previously mentioned:

Target Abandonment Rate: Various state and/or federal abandonment rates may have to be complied with. An abandoned call may be defined as a call answered by a person, but which is not connected to an agent within two seconds. The actual abandonment rate may be measured over a set time period for a particular campaign, and cannot exceed a given percentage of calls as defined by the governing abandonment rate.

Attempt Counter: A limit may be defined for the number of call attempts that can be made to a number over a time period (e.g., day, week, or month), as well as the minimum time period that must occur between call attempts.

Identification Message: If a party answers a call, they should be connected to an agent within a set amount of time (2 seconds) and if this is not possible, then the party should be presented with an identification message prior to the dialer abandoning the call or with a message for the next available agent.

Call Screening: Telephone numbers may be defined in various databases as being excluded from certain types of calls. These databases are frequently termed "do-not-call" databases or "do-not-call lists" and may be national, state, or business-specific in scope. Other do-not call databases may identify numbers as wireless numbers, as these may be excluded from being called for certain purposes. In some instances, exceptions may exist where the party has authorized contact despite being included on one of the do-not-call lists. Further, a party may provide authorization to be called on one number (e.g., a home number), but not on another number (e.g., a wireless or work number).

Calling Window: Call originations may be limited to occur within certain time periods relative to the local time of the called party. For example, calls may be limited between 8:00 a.m. and 9:00 p.m. according to the local time of the called party. This may require using the called telephone number and/or account records to ascertain the appropriate location and time zone of the called party. In the case of wireless numbers, which are mobile, it may be difficult to ascertain which time zone or geography where the called party is located in.

Call Recording/Call Recording Exclusion: Depending on the state, certain calls may be recorded without the called party's consent to aid in quality control or to ensure that certain compliance requirements are met. On the other hand, certain states do allow recording without the called party's consent. This may be further impacted based on the statutes of the state where the call originated from as well as the state the called party is located in.

Alternate Number Dialing: If a call to a party is unanswered, then alternative numbers associated with that party may be used. However, various conditions and requirements may be associated with the usage of these alternate numbers, since the conditions and requirements associated with using the first number are not necessary applicable for using the alternative number.

State Specific Reporting Requirements: Calls originating from, or terminating to, a given state may have state-specific reporting requirements.

Contact Center Specific Policies: A contact center may modify any of the above requirements to make the requirements more restrictive. For example, whereas certain regulations may limit calls between 8:00 a.m. and 9:00 p.m., a contact center may chose to prohibit calls before 9:00 a.m.

The application of the above compliance requirements may depend on the purpose and nature of the call, or whether there is any form of pre-existing relationship between the parties.

The list of compliance requirements provided above is illustrative and is not intended to be exhaustive. Some of these requirements may be applicable for dialing wireless numbers under certain context for certain regulations, whereas other requirements may be applicable for other types of numbers or other regulations. Other requirements may be applicable and may be regulated by the contact center itself (via internal contact center policies), or by local, state, or federal government regulations.

The above demonstrates that there is a complex set of compliance requirements that may be applicable when dialing a telephone number. Additionally, when dialing a wireless number, additional compliance requirements may apply. Specifically, certain prohibitions apply when dialing a wireless number, e.g., wireless numbers should not be dialed by an "autodialer." Complicating matters is that it is not always readily possible to detect with certainty by examining the telephone number itself whether it is a wireline number or a wireless number. For example, years ago wireless numbers were allocated using a unique area code and office code (e.g., "NPA-NXX" or the first six digits of a ten digit telephone number). Thus, individuals familiar with telephone numbers in a local area could ascertain whether a telephone number was wireless or wireline by examining the NPX-NXX portion of the telephone number. However, that typically is no longer the case as an NPX-NXX may be allocated to both wireline and wireless numbers. Since contact centers may originate calls to any location in the United States, it is unreasonable to expect an agent to be familiar with local telephone numbers. Further, a wireline telephone number can be ported to a wireless service provider. Consequently, it is generally not feasible for an agent to determine by examining the telephone number itself whether it is a wireline or wireless number.

Having an agent manually dial a wireless number may avoid the prohibition of using an "autodialer." For purposes herein, "manually dialing" refers to the agent indicating on a digit-by-digit basis the telephone number to a device which originates the call, and it can be assumed that the device does not "store or produce" the number dialed, and otherwise avoids the requirements for an "autodialer." In some embodiments, the agent may request that the numbers be dialed. In one embodiment, the device could be a PBX that can be used to manually dial a number and is generally considered to be outside the scope of an "autodialer."

However, having an agent manually dial a number increases the risk of failing to comply with current or future compliance requirements. For example, a predictive dialer can ensure that restrictions are met in regard to:

dialing a number during certain hours of the day per the local time zone of the called party, limiting the number of attempts per telephone number, individual, or account holder, limiting the number of messages left (voice mail or answering machine messages) associated with a telephone number, and ensuring there is a minimum amount of time between call attempts per telephone number, individual, or account holder.

Relying on human operator skill to meet all the applicable compliance requirements is likely to result in a compliance violation sooner or later. For example, an agent in a contact center may be located in the Eastern Time zone. At 9:00 a.m. in the Eastern Time zone, it is 6:00 a.m. in the Pacific Time zone. Regulations may allow the agent to dial a number terminating in the Eastern Time zone, but not in the Pacific Time zone. Given a particular number, it may be difficult for the agent to know what time zone the called party is in. While this may be manually determined, computerized approaches are faster and more accurate. Predictive dialers have safeguards that ascertain the time zone of the target telephone number, and/or compare this with the corresponding person's residential location to determine whether the call can be originated. An agent may make an error and call an individual in the Pacific Time zone at 6:00 a.m.

Further complicating meeting the compliance requirements is that typically a group of agents is involved in dialing the target parties. Coordination between agents is required, so that duplicative efforts are avoided. It is easy to imagine various scenarios where this can occur, including for example, where an agent dials a target party and leaves a message and is shortly followed by another agent calling that same number and leaving another message. In certain contexts, the result could be deemed harassment.

Further, the set of requirements that are applicable to dialing a particular call may change in the future. Additional regulations may be imposed, as well as changing contact center policies may have to be adhered to. Thus, the challenge is how to ensure that manually dialed calls to wireless numbers by agents in a contact center are still subjected to compliance enforcement. Further, the infrastructure should be adaptable to future or changing requirements. While dialers are well suited for processing a number to enforce compliance aspects, they cannot be used to dial the wireless number itself in certain situations, in light of some interpretations of the applicable statutes and FCC regulations. Thus, an approach is required for coordinating the compliance enforcement mechanisms in a dialer with calls established by the PBX.

Contact Center Context

FIG. 1 shows one embodiment of a contact center architecture 100 illustrating the various technologies disclosed herein. Although many aspects of contact center operations are disclosed herein in the context of voice calls, the contact center may process other forms of communication such as facsimiles, emails, text messages, video calls, chat messages, and other forms. The term "party" without any further qualification refers to a live person (as opposed to an answering machine or voice mail service) associated with an instance of communication originated by the contact center.

The contact center shown in FIG. 1 may process voice calls that are originated by a dialer 155. The dialer 155 is typically configured to dial a list of telephone numbers to initiate outbound calls. The list of telephone numbers may be stored in a data store 175 that is accessible using a local network 170. The dialer 155 may directly interface with voice trunks using facilities 116d to the PSTN 115 for originating calls. After the calls are originated, a transfer or connect operation by the dialer 155 may connect the call with an agent, or place the call in a queue for a next available agent. In the latter case, announcements or music may be provided to the party while they are waiting.

In various embodiments, the dialer 155 may be a predictive dialer that makes use of one or more pacing algorithms to determine how and when to dial a list of numbers so as to minimize the likelihood of a called party being placed in a queue while maintaining effective agent utilization. The dialer 155 may "dial ahead" by originating more calls than there are available agents, expecting that some calls will not be answered by live parties, or that an agent may become available in time. The dialer 155 also ensures that applicable compliance requirements are enforced.

Outbound voice calls may originate from the contact center to parties using a variety of phone types. A party may receive a call at a conventional analog telephone 110b connected to a public switched telephone network ("PSTN") 115 using an analog plain old telephone service ("POTS") line 116a. The call may be routed by the dialer to the PSTN 115 and may comprise various types of facilities, including, but not limited to: T1 trunks, SONET based fiber optic networks, ATM networks, PSTN trunks 116d. The dialer may also route calls to other networks, such as the Internet 123a, 123b using facilities 116e, 116c.

Voice calls may also be received at a mobile device 110c, such as a smart phone or tablet, which wirelessly communicates with a mobile service provider ("MSP") 112. The voice calls may be routed to the PSTN 115 using an integrated services digital network ("ISDN") interface 116b or other types of interfaces that are well known to those skilled in the art. The MSP 112 may also handle calls as packetized voice, referred to herein as voice-over-IP ("VoIP") to an Internet provider 123b using Internet-based protocols. For convenience, unless indicated otherwise, the term "trunk" refers to any type of communication facility providing voice calls to, or from, the contact center, regardless of the type of protocol or technology used. Specifically, a "trunk" as referred to herein is not limited to time-division multiplexing ("TDM") technology.

Voice calls may also be received by a party employing a so-called "IP phone," "VoIP phone," or "soft phone" 110a. In one embodiment, the soft phone may comprise a computing device 105, such as a laptop, desktop, or computing tablet, which interfaces with a headphone/microphone combination, also referred to as a "headset" 106. An IP phone may use a digital voice control protocol and may process packetized voice data according to various Internet based voice protocols, such as session initiated protocol ("SIP"). The call may be conveyed by other types of Internet providers 123a, such as a cable company providing Internet access services over a coaxial cable facility 116e. Those skilled in the art will recognize that a variety of protocols and facilities may be used to convey voice calls.

In the contact center, calls may be routed over facilities 165 to agents for servicing. These facilities may be time division multiplexed ("TDM") or voice over IP ("VoIP") based. After a call is originated by the dialer 155 and a called party answers, the call may be connected with an agent using facilities 165. The physical area at which the agent sits is often referred to as the agent's "position" and these positions are often grouped into clusters that are managed by a supervisor, who may monitor calls and the agents' productivity. An agent usually uses a computing device, such as a computer 160a-160c and a voice device 161a-161c. The combination of computer and voice device may be referred to as a "workstation." Thus, the workstation collectively has a data capability and a voice capability, though separate devices may be used. In some instances, "workstation" may be used in reference to specifically either the data or voice capability at the agent's position, as appropriate to the context. For example, "routing the call to the agent's workstation" means routing a call to one of the voice devices 161a-161c at the agent's position. Similarly, "routing the call to the agent" means routing a call to the appropriate equipment at an agent's position.

The voice device used by an agent may be a soft phone device exemplified by a headset 161a connected to the computer 160a. The soft phone may be a virtual telephone implemented in part by an application program executing in a computer. The phone may also comprise an Internet Protocol ("IP") based headset 161b or a conventional phone 161c. Use of the term "phone" is intended to encompass all these types of voice devices used by an agent, unless indicated otherwise. In some embodiments, the voice traffic to the soft phone may be transmitted using the same facilities 168 used to convey data to the agent's workstation computer. In other embodiments, voice may be conveyed on separate facilities 165.

After completing a call, the dialer 155 may generate call record data that is stored in the data store 175 and the data store may include a database. The call record data indicates the progress and status of the call. The call record data may indicate the time the call was originated, the number dialed, the call disposition, when the call was answered, whether an answering machine was encountered, etc. In some embodiments, call recording of the audio data of the call may also be stored in the data store 175. The audio of the call may be analyzed by a speech analytics system to ensure that the agents properly handled the call and followed the appropriate procedures, and can be used to evaluate agent performance.

The contact center may also incorporate a private branch exchange ("PBX") 135. This may be embodied as a TDM or VoIP based switching device for handling voice calls as well as incorporating other capabilities. Other embodiments may use a private automatic branch exchange ("PABX"), Internet-Protocol-PBX ("IP-PBX"), or other switching device. The term "PBX" as used herein is intended to encompass these variations. The PBX 135 may allow agents to use their phones 161a-161c to originate and/or receive calls to other agents using facilities 165 or 168, as well as originate or receive "outside" calls via facilities 123 to the PSTN or facilities 116h, local network 170, and 116f to the Internet 123b. Various topologies and configurations are possible as to how the PBX may provide access. Specifically, an agent may dial a number to place a call (such as to a wireless device 110c) using a conventional, VoIP, or ISDN phone 161a-c using facility 165 via PBX 135. In some embodiments, the agent may dial the number to place the call via phone 161a using facilities 168 and 116h via the PBX.

Normally, agents may communicate using a phone with either a PBX or a dialer in a contact center, but not both. The PBX and dialer are typically configured so that each can complete their respective call processing functions (for either incoming or outgoing calls as may be appropriate) in a stand-alone configuration, without requiring cooperation with each other to complete a call.

In addition, the contact center may incorporate a compliance server 125. The compliance server 125 may connect via facilities 116i to the local network 170, which in turn may provide access to facilities 165 to phones as well as facilities 168 for voice and data, depending on the contact center configuration. The compliance server may have facilities 127 to the PBX, the role of which is discussed further below. In some embodiments, the compliance server 125 may be a modified dialer or incorporate aspects of a dialer, with respect to accomplishing compliance enforcement.

The architecture shown in FIG. 1 illustrates one possibility, and does not limit application of other architectures of the principles and technologies presented herein. Further, not all aspects and components shown in FIG. 1 are required in all embodiments. Thus, a contact center may have agent positions using only a workstation configuration 160a, 161a involving soft phones, whereas other contact centers may use other configurations. In some configurations, the phones may be capable of handling two lines, and may have the capability of handling a dialer originated call on one line and a manually originated call via the PBX on another line. Those skilled in art will recognize FIG. 1 represents one possible configuration of a contact center architecture 100, and that variations are possible with respect to the protocols, configurations, facilities, technologies, and equipment used.

The above components may be variously referred to as a "computer," "processing device," "unit," "component," or "system" and may incorporate therein a local data store or database, or interface with an external database. Use of the word "server" herein does not require the component to interact in a client-server arrangement using web-based protocols with other components, although that may be the case. Further, the above components may be located remotely from (or co-located with) other components. Furthermore, one or more of the components may be implemented on a single processing device or platform to perform the functions described herein.

In addition, the contact center architecture 100 may be provided as a hosted solution, where the call processing functionality is provided as a communication service (a so-called "communication-as-a-service" or "CaaS") to a contact center operator. Thus, there is no requirement that the components identified above must be actually located or controlled by a contact center operator.

In addition, the agent positions can be co-located in a single physical contact center or in multiple physical contact centers. The agents can be remotely located from the other components of the contact center, and may also be remotely located from each other, sometimes referred to as a "virtual contact center." A virtual contact center may describe a scenario where agents work at home, using their own computers and telephones as workstations. In some configurations, a single physical location of the contact center may not be readily identifiable. This may occur when the call processing functions are provided as a service in a hosted cloud computing environment and the agent positions are in their individual residences.

Figure 2:
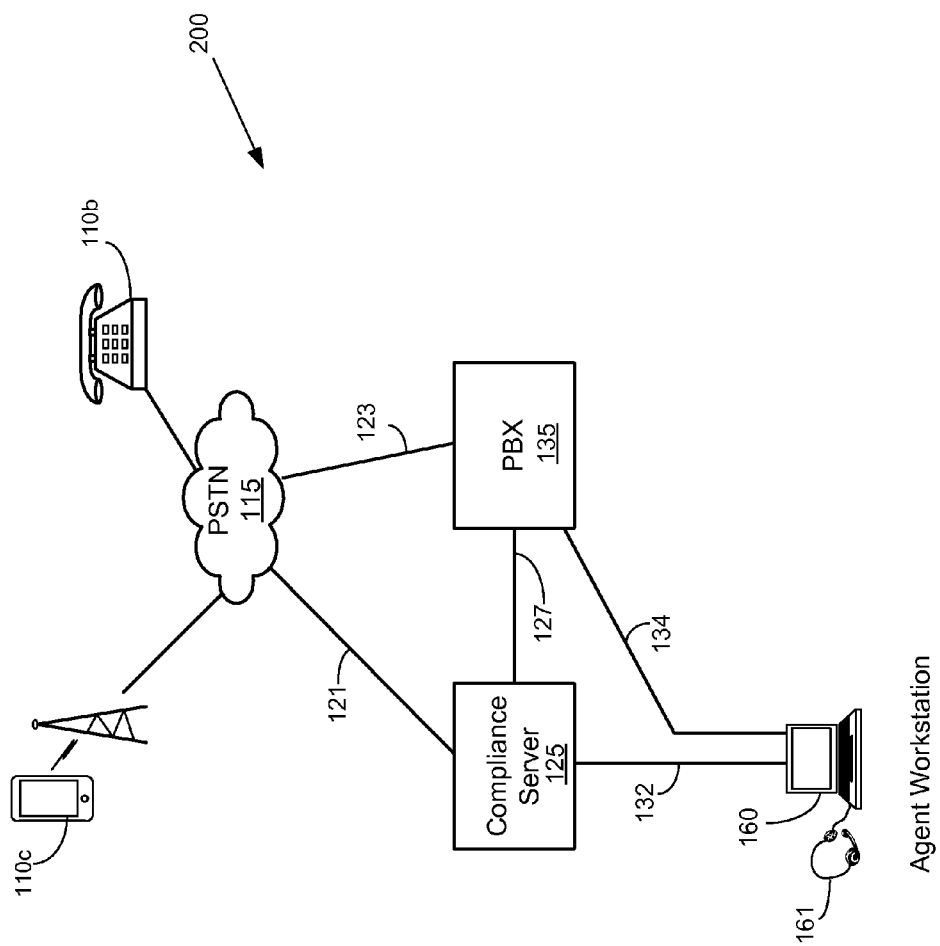
FIG. 2 illustrates one embodiment of an architecture comprising a compliance server and a PBX in a contact center used to provide compliance enforcement when an agent originates a call to a wireless number.

A simplified description of the architecture of the contact center as it relates to using the compliance server 125 and the PBX 135 is shown in the system 200 of FIG. 2. In FIG. 2 the agent's workstation comprises the phone 161, which is a softphone, and a computer 160. The computer is used to provide information to the agent relating to the account that the agent will dial. The computer may have a communications channel 132 to the compliance server 125 for receiving such data and another communications channel 134 to the PBX 135 used for the wireless call origination. This configuration may vary in other embodiments. Further, the communications channels 134, 132 may represent different physical or logical channels in different embodiments.

The PBX 135 is connected to the PSTN 115, via facilities 123 which is turn is able to route calls to wireless numbers associated with a mobile phone 110c or calls to wireline numbers associated with a conventional telephone 110b. Although the PBX can be used to originate calls to wireline numbers, the illustrations herein largely focus on originating calls to wireless numbers. The compliance server 125 is illustrated as having facilities 121 to the PSTN. This can be used to originate other calls to wireline numbers or receiving incoming calls. In some embodiments, the compliance server does not have any facilities 121 for conveying voice traffic to the PSTN 115, or the Internet. Again, since the illustrations herein largely focus on originating calls by the PBX to wireless numbers, the communication facility 121 is not required in all embodiments. The compliance server 125 may be interconnected with the PBX 135 via facilities 127. This may be a signaling link, a voice communication facility, or a combination of the two.

EMBODIMENTS

Various embodiments are possible to provide compliance enforcement for manually dialed calls to wireless numbers. The embodiments generally involve cooperation between the compliance server 125 and a PBX 135. Although shown as two separate devices in FIG. 2, these two components can be integrated into one device in some embodiments. The compliance server 125 may incorporate certain aspects of a predictive dialer, as predictive dialers are typically used to enforce compliance when originating calls. In the embodiments disclosed herein, the compliance server enforces compliance for calls to wireless numbers, but does not originate the wireless calls. The PBX 135 (or other similar form of switching device) originates calls to the wireless numbers that are dialed by the agents using the phones at the agents' positiond. Note that in some embodiments, the compliance server 125 receives and processes voice data from the PBX 135, as the compliance server may be involved in recording or processing of audio data associated with the wireless call. The audio data may be stored and/or relayed to a data store by the compliance server. Thus, although the compliance server may not originate voice calls, it does not necessarily exclude the compliance server from receiving and processing voice and audio data.

Embodiment One

This approach incorporates the PBX 135 for originating calls to a wireless number that is manually dialed under the control of the agent using the phone 161. Although the embodiments herein are illustrated using a PBX, other switching elements can be used, including, but not limited to: an IP-PBX, optical switch, voice switch, router, PABX, session border controller, MPLS switch, etc. In short, the principles and technologies can be applied to any device capable of switching voice data. The PBX 135 cooperates with the compliance server by bridging (a.k.a. conferencing) the compliance server 125 onto the call originated by the PBX 135. All dialing is manually under the control of the agent interacting with the PBX 135, and the storage of the numbers to be dialed is in the compliance server 125, which is separate from the PBX. The compliance server is able to maintain status information about the call and/or agent, to ensure that regulations are complied with.

Figure 3:
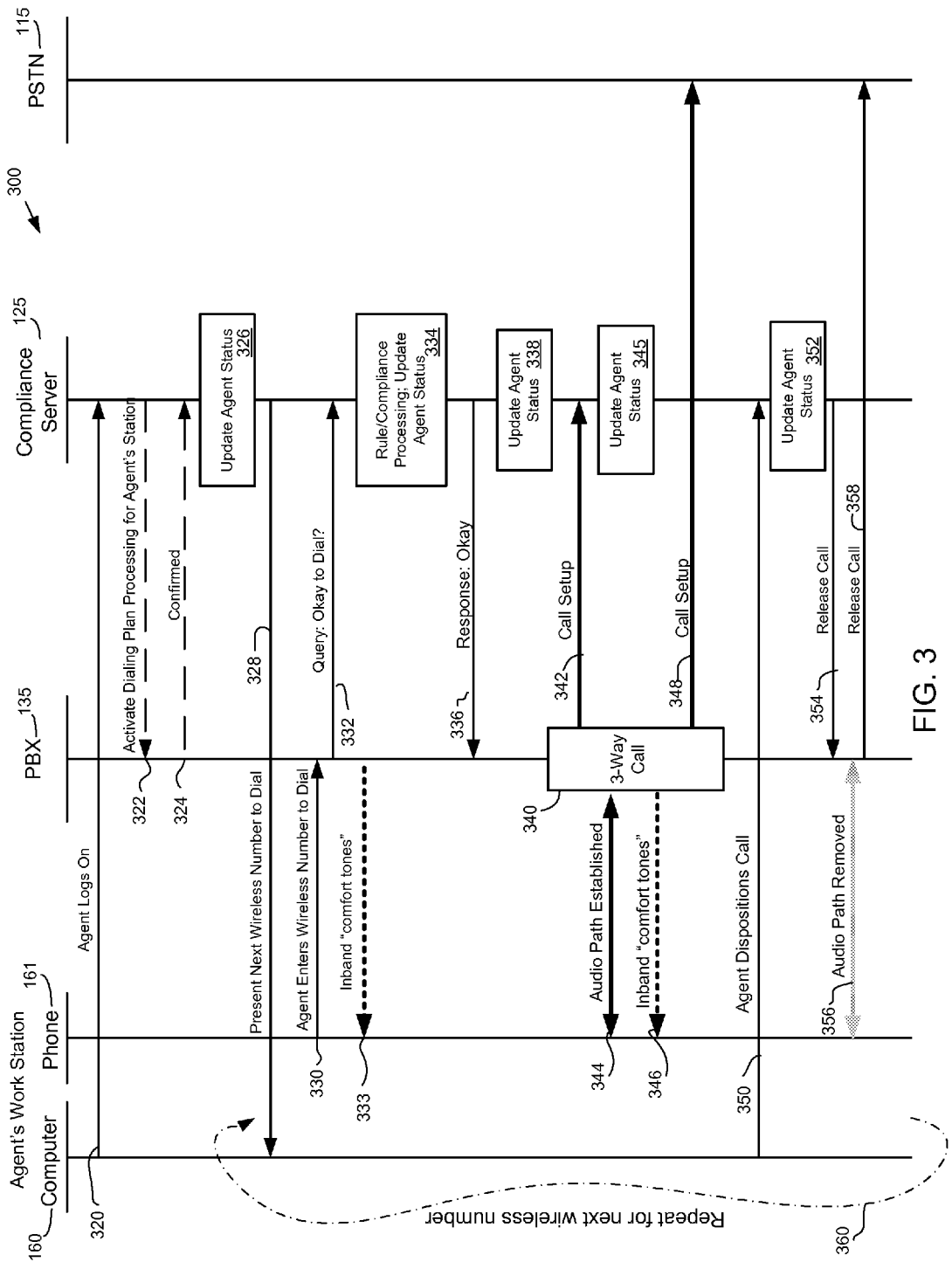
FIG. 3 illustrates one embodiment of a message flow between various components for providing compliance enforcement when originating a call to a wireless number.

Turning to FIG. 3, a messaging diagram 300 shows the message flow that occurs between various components, namely the agent's computer 160 and phone 161, the PBX 135, the compliance server 125, and the PSTN 115. The computer 160 and phone 161 are co-located at the agent's workstation or work position and are both operated and controlled by the agent. Although the phone may be a soft phone, the principles apply to using a VoIP or conventional phone.

The PBX 135 is a well known device for originating calls that are manually dialed under the direction of the agent. It is presumed that the PBX does not meet the "autodialer" requirements as considered by the FCC rules. Specifically, the PBX does not (or is not configured to) generate or store the number manually dialed by the agent as defined in the context of the TCPA. Rather, the agent manually enters the digits of the wireless number using the phone 161 that will cause the PBX to originate a call to that number. Any number of approaches for the phone signaling to the PBX may be used.

The compliance server 125 may be a computing system as is well known in the art. It may incorporate aspects of a dialer, particularly the compliance enforcement functions found in certain commercially available dialers, such as the Noble Systems Corporation Maestro™ predictive dialer. The compliance server is typically not used to originate calls to wireless numbers.

Finally, the PSTN 115 is shown to convey the call originated by the PBX to the called party. In other embodiments, the Internet or other form of network may be used. Reference to the PSTN should not be construed to limit any of the technologies used herein from using VoIP, SIP, or other forms of digital telephony.

The process begins with the agent using their computer 160 to log-on to the compliance server at operation 320. This process indicates to the compliance server 125 that the agent is available to handle calls, and allows the compliance server 125 to perform various functions associated with an agent logging on. The compliance server 125 knows which agent phone extension is associated with the agent, what skill level the agent has, schedule, what campaigns the agent may participate in, etc. As a result, the compliance server 125 updates the agent's status and adds the agent to the pool of available agents for handling calls.

Next, the compliance server 125 may activate a trigger on the PBX 135 associated with the agent's dialing plan via signaling at operation 322. The trigger is a process in the PBX that is involved when processing call origination requests from the agent. In other words, this defines how the call origination for that agent's phone is to be handled by the PBX. When activated, the PBX will automatically establish a conference call involving the compliance server. The signaling at operations 322 and 324 are optional, in that some embodiments may provision the trigger in the PBX permanently for the agent's phone. However, in this embodiment, the trigger for the agent's phone is only activated when the compliance server 125 determines that the agent will be engaged in a campaign involving manually dialing wireless numbers. Otherwise, the PBX may interpret call setup from the agent's phone in a conventional manner.

The PBX may confirm back to the compliance server 125 that triggering for the agent's phone will occur at operation 324. At this point, the compliance server 125 may update the status associated with the agent and/or call in operation 326, since the compliance server now knows the agent is ready to originate calls.

As it will be seen, the compliance server is able to track and update the status of the agent and/or call throughout the various steps encountered by the agent/call. Although the compliance server does not originate the call to the wireless number, the compliance server is timely notified in various ways so that it is able to maintain current status information in a largely comparable manner as if it had originated the call.

The compliance server 125 at this point may update the appropriate status or state for the agent to reflect the operational status of the agent's phone and/or computer. The compliance server 125 may include the agent in internal queues for handling calls associated with the campaign. In this embodiment, it is presumed that the agent is engaged in a campaign that involves initiating calls to wireless numbers. The campaign may involve a list solely comprising wireless numbers or may involve a mix of wireless/wireline numbers. Once the compliance server 125 determines the agent is ready to originate a call, the compliance server 125 sends information at operation 328 to the screen of the agent's computer 160 indicating one or more numbers to dial.

The presentation on the agent's computer of what number(s) that should be dialed may be presented to the agent in various formats. The information may include the number, as well as other related account information. In one embodiment, a plurality of numbers is presented in a grid format. This provides numbers on a variety of accounts, where each account may have multiple numbers associated with that account. This allows the agent to determine which of several numbers they will dial next. The grid may be a series of rows with fields for account number, account holder name, amount due, address, and notes. In other embodiments, a single wireless number, along with account information, may be provided to the agent. A variety of graphical user interface formats may be presented in which the agent is informed of a wireless number to dial. In various embodiments, the graphical user interface presented may mimic the same format used to dial wireline numbers by a predicative dialer.

The compliance server may select or identify the number(s) that the agent may select from to dial. In one embodiment, the compliance server has already performed the necessary compliance processing before presenting the numbers to the agent to select from. Doing so ensures that only allowable or compliant numbers are presented to the agent to dial. In other embodiments, the compliance server may perform compliance enforcement at a later stage (see processing operation 334 below).

After receiving a message at operation 328, the agent reviews the account information on their computer screen. It is presumed that if multiple accounts and/or telephone numbers are presented, that at least one number is a wireless number and that information is conveyed to the agent indicating it is a wireless number. Of course, if the entire list comprises wireless numbers, then the agent may be informed at the beginning when reviewing the list or otherwise understand that all numbers are wireless numbers.

The agent may then manually dial the wireless number presented on the computer screen using the phone that is connected to the PBX 135. This is represented by the signaling at operation 330 in FIG. 3. Based on the phone technology used by the agent, there may be a series of distinct inputs by the agents as they individually press a key or screen icon indicating a dialed digit of the called telephone number. For simplicity, a single message at operation 330 is shown.

Different phone technologies may be used by the agent. The phone may be an analog phone in which the agent presses physical keys on the phone to generate dual-tone multiple frequency ("DTMF") tones. The phone may be a physically distinct VoIP phone or an ISDN based telephone, also having a keypad. In this case, the agent pressing a key may result in SIP or ISDN signaling when sending the one or more messages at operation 330. In other embodiments, in-band DTMF tones, proprietary station set signaling, or other forms of signaling may be used. The phone could be a soft phone that is integrated with the computer and interfaces with the PBX using any of the above signaling protocols. In one embodiment, the digit keys may be icons on the computer screen that are selected by the agent or the keys may be indicated using the numerical keypad on the agent's computer keyboard. Depending on the soft phone embodiment, various human interface interactions may occur for the agent to dial the wireless number. For example, the agent may use a mouse, a pointer, a touch screen, a separate keypad interfacing to the computer, speech recognition, etc.

Depending on the phone technology used, the agent may hear in-band tones. In some embodiments, the agent may hear a dial tone and DTMF tones, which may occur if a conventional phone is being used. In other embodiments, such as when using a VoIP phone, "comfort tones" may be provided to the agent to emulate a dial tone and DTMF tones, even though the signaling of the wireless number is conveyed via out of ban messages. Thus, the agent may be provided such tones in operation 333. Whether and how this occurs is defined according to the dialing procedures associated with the agent's phone and the PBX.

Upon receiving the wireless number to dial, the PBX 135 processes the received digits, and then may transmit a query to the compliance server 125 at operation 332. The query essentially asks the compliance server whether it is okay for the PBX to dial the call. Or, in other words, have the appropriate compliance requirements have been met? The query typically includes the number dialed by the agent, as well as the station ID and/or agent ID. Other information may be included in the query. The query can be structured according to a number of available protocols known by those skilled in the art, including any of the Internet-related protocols, telephony-based protocols, proprietary protocols, including H.323 protocols. Inter-Asterisk Exchange Protocol ("IAX"), etc. In some embodiments, the query is optional as the compliance server can confirm or deny authorization for the call to proceed upon receipt of a call leg from the PBX (see below).

In one embodiment, the PBX is not aware of the various compliance requirements, nor does the PBX store the dialing list including the wireless number, nor produce the wireless number to the agent. Thus, the PBX may not know if the number was just dialed by another agent, but the compliance server may know. Consequently, the PBX relies upon the compliance server to perform the compliance processing and hence asks the compliance server whether the number can be dialed.

If the compliance server 125 has not already done so, the compliance server 125 applies the various compliance processing rules in operation 334 to determine whether the applicable compliance requirements have been meet. The requirements may be dependent on various aspects, including contact center policies, context/purpose of the call, government regulations, etc. The compliance server 125 further updates the status information associated with the agent and/or call. Specifically, the compliance server 125 now knows that the agent has initiated a call request and knows the number dialed, as well as the list of numbers presented to the agent from which the number was selected. The compliance server may verify that the number dialed by the agent is one of the numbers just presented to the agent. Assuming that all the applicable compliance processing rules have been applied and the compliance server has determined that the call may proceed, the compliance server confirms to the PBX that the call may proceed via a message at operation 336. An error or non-compliant condition may instead result in signaling at operation 336 indicating to the PBX that the call should not be established or indicate the error condition.

The compliance server may update status information associated with the call/agent in operation 338. For example, the compliance server now knows that the agent has manually dialed a wireless number via the PBX, and the PBX is in the process of handling the call.

After receiving the response 336, the PBX proceeds by establishing a 3-way call (i.e., a conference call) using a conference bridge 340 wherein a first call leg 342 is established to the compliance server 125. This again can be accomplished using any well known protocol such as session initiated protocol ("SIP"), integrated services digital network ("ISDN"), H.323, etc. After the compliance server confirms to the PBX that the call may proceed at operation 336, the compliance server may start a timer in expectation of receiving the incoming call leg 342 from the PBX. In one embodiment, information is conveyed in the ANI (calling party number) or DNIS (called party number) of the call leg 342 that may indicate the wireless number dialed by the agent, to allow the compliance server to associate the call leg 342 with the agent, and the number selected by the agent. Other signaling mechanisms could be used in other embodiments. The expiry of the timer indicates an exceptional condition, such as abandonment of the entire process or a failure of the PBX. Once the compliance server receives the incoming call leg 342, the compliance server will update the status associated with the agent in operation 345.

Although not shown in FIG. 3, the compliance server may further bridge the call leg 342 with a recording system (not shown) that may involves another call leg originating from the compliance server. In other embodiments, the recording of the call may involve the compliance server merely copying the audio data to a file or data store.

Co-incident with this process, the PBX also establishes an audio path 344 to the phone of the agent. This could be considered another call leg of the conference call. The details on how this is performed vary as to the type of phone used by the agent. For example, the phone used may be an analog phone, a digital phone (non-VoIP), a digital VoIP phone, or a soft phone that is integrated into the computer. In each case, the phone is logically distinct from the computer, even if integrated into the computer. Appropriate signaling and procedures are based on the type of phone and are well known. In some embodiments, this audio path may be initially established for the first wireless call and maintained until the agent logs out.

Next, the PBX establishes another call leg 348 to the dialed party. This may occur using various types of signaling, such as POTS, ISDN, SIP, etc. The PBX may also provide, optionally, the aforementioned in-band comfort tones 346 to the agent to inform the agent of the progress of the call. The provision and form of the tones may vary based on the technology, including the particular form of telephone used by the PBX. For example, the PBX may be a VoIP-based platform, so that there is no in-band tones produced to the agent's phone as is found in a POTS system. In other embodiments, the PBX may generate a dial tone and DTMF tones as the call leg 348 to the dialed party is established mimicking the POTS operation. In some embodiments, the DTMF tones are not the basis for actually conveying address information between the PBX and the telephone network, as that information may be conveyed by other forms of out-of-band signaling, including SIP, ISDN, or MF. However, in other embodiments, the PBX may be a TDM-based system that does actually provide and use DTMF for conveying dialed digits. It should be recognized that a wide variety of arrangements are possible for providing tones to the agent to reflect the manually dialed wireless number.

Once the dialed party answers the call leg 348, a three-way or conference call is established between the agent, the called party, and the compliance server. The compliance server is largely "listening" and may not provide any audio to the conference. The compliance server may perform recording, quality analytics, speech analytics, etc, similar to as if a predictive dialer had originated the call. For example, the compliance server may monitor any in-band tones or signals provided by the PSTN or remote party, such as a busy signal, answering machine greeting, or other special information tone ("SIT tone"). The SIT tone can indicate whether a number is disconnected, ported, etc. This allows the compliance server to properly record the status of the call (i.e., disposition the call), as opposed to the agent manually entering the status or disposition code. Thus, the compliance server may have exposure to all of the audio data associated with the call in order to perform the complete suite of compliance enforcement functions.

It should be appreciated that in this arrangement, the agent has initiated the call via the PBX, not the compliance server. Further, although the compliance server may have indicated to the agent one or more wireless numbers to be dialed, the agent selected the number and manually dialed the wireless number using the PBX, in a similar manner to that which the agent would use to perform any other manually dialed call using the PBX. Further, the PBX does not store, produce, or access a database for originating the call to the wireless user.

It should also be appreciated that the above steps may vary in different embodiments. Specifically, the call leg to the agent, the call leg to the compliance server, and the call leg to the called party may be variously established serially, in parallel, or in combination. In some embodiments, the audio path to the agent may be maintained between calls. In other embodiments, the audio path to the compliance server may be maintained, and other signaling approaches are used to convey the dialed number to the compliance server. No doubt those skilled in the art can develop other variations for coordinating the compliance server and the PBX upon reading this disclosure.

Once the agent has completed their interaction with the called party, the three-way call is terminated. This can occur in various ways. The approach shown in FIG. 3 illustrates the agent indicating a disposition code for the call using their computer. The disposition code indicates the status of the call, such as whether the right party was reached, an issue was resolved, a sale completed, etc. In some cases the agent is expected to indicate the disposition (a.k.a. dispositioning the call). This is typically required when the agent has spoken with an answering party, since the code depends on the substance of the conversation. In some instances, the compliance server can disposition the call. For example, the compliance server can listen to in-band call progress tones and indicate whether the call encountered busy, no-answer, a disconnect tone, or was answered by an answering machine. Allowing the compliance server to disposition the call in such cases relieves the agent from having to do so, and often results in a more accurate disposition of the call.

The computer will convey the disposition code to the compliance server at operation 350. In response, the compliance server updates the agent's status in operation 352. At this point, the compliance server knows that the call is over and releases the call leg 354 to the PBX. In response, the PBX also then removes the audio path 356 to the agent or otherwise release that call leg to the agent's phone. Again, the specific details of this process depend on the type of phone being used. Finally, the PBX releases the call leg to the party at operation 358.

The operation of the 3-way bridge may be slightly modified from the operation of a conventional 3-way bridge. In a conventional 3-way bridge, if an added leg to a conference is dropped, the conference bridge may remain intact (e.g., the other remaining call legs are retained). However, in this embodiment, the 3-way bridge operates such that if any call leg is dropped, the remaining call legs are also dropped. This is because the compliance server is bridged to the call between the agent and the remote party to only listen to that call. This allows the compliance server to perform any of the various recording and analytic functions mentioned above. The compliance server only drops its call leg to the PBX if the agent dispositions the call, e.g., indicates the call is completed. The compliance server is configured so that when the agent dispositions the call, the compliance server construes this action as the agent having completed the call with the called party and initiates releasing the call leg. The agent could have alternatively released the call to the called party (i.e., to the PBX) and then disposition the call to the compliance server.

If the called party terminates their call leg, then there is no need for the agent to be bridged to the compliance server, and again there is no need to keep the bridge up. Similarly, if the agent terminates their call leg first, then call leg to the called party should be terminated. At that point, there is no need for the call leg to the compliance server, so it is released as well.

As evident, there are a number of alternatives possible in the message flows shown above. The exact sequent of events that occur when the 3-way call is established can vary from what is shown, and there are various alternatives for releasing the three-way call. Other variations exist as to when certain compliance operations are performed, how the outcome of the compliance testing is indicated to the PBX, and how other operations are performed. FIG. 3 is not intended to limit the potential ways that the overall system may operate.

For example, as shown in FIG. 3, the coordination between the PBX and the compliance server is manifested via a query 332 and response 336. The query could be implicit when the PBX establishes the call leg 342 to the compliance server. In such embodiments, there may not be an explicit, stand alone query 332. In some embodiments, the calling party telephone number used by the PBX in the call to the compliance server could be the same value as the wireless number. This allows the call leg to be correlated with a particular wireless number in the compliance server. The compliance server then responds by accepting the call leg or rejecting the call leg as indications that the call can proceed or not. In some embodiments, this information may be conveyed by user-user-information ("UUI") in ISDN messages. In other embodiments, the PBX may not bridge on the compliance server via a three way call. However, not bridging the compliance server prevents the compliance server from performing certain functions, such as call recording, monitoring call progress tones, etc.

Also, it is evident that the compliance server is able to maintain current status information about the agent and/or call based on agent interactions with the compliance server via the computer, as well as updates from the PBX, and by monitoring in-band tones as the call progresses. These inputs allow the compliance server to know the relative state of the agent and/or the call and when the agent is ready to initiate another call. The compliance server also knows what telephone numbers the agent enters to the PBX. Thus, although the compliance server is not originating or controlling call establishment, it is able to effectively monitor the call progress as if it had originated the call.

Once the 3-way bridge is released, the entire process may loop back 360 and repeat. The compliance server may present the agent with a new list of wireless numbers that may be dialed, and the agent can select the desired number and originate another call. The compliance server may update its records as to which numbers were dialed and may ensure that the new numbers presented to the agent do not result in compliance violations if dialed. The compliance server can ensure that the agent completes a disposition code before additional numbers are presented to the agent, or before another call is allowed to proceed if dialed by the agent. The compliance server is able to maintain statistics of how long the agent was on the call, duration between calls, number of calls originated per time period, status of the originated calls, etc. In short, virtually any performance metric that is regularly maintained by a conventional predictive dialer can be applied, used, and maintained by the compliance server.

At each step of the process, the agent is controlling the call establishment by selecting the number to be dialed, entering the dialed number, and listening to the call progress tones generated by the PBX when generating the call. Further, the PBX is not originating the call automatically, nor is the PBX dialing a number from a database.

Blended Operation

Blended operation refers to a contact center handling both incoming and outgoing calls. Blended operation may provide a benefit of allowing agents to originate outgoing calls when there are few incoming calls. In many embodiments, the incoming calls are handled by an automatic call distributor ("ACD") that may be a stand-alone device, or integrated with the PBX or the compliance server. The ACD may offer the call to the agent using a separate phone. Thus, in some embodiments the agent may have two phones, e.g., a physical VoIP phone distinct from their computer for originating calls via the PBX to wireless numbers, and a soft phone integrated into their computer for handling incoming calls. In other embodiments, the agent may have a phone capable of handling two lines (either physical or logical). For example, the agent may have a soft phone which is able to receive incoming calls from the ACD on one VoIP channel and originate outgoing calls to the PBX using another VoIP channel. In other embodiments, the agent may have one phone capable of only handling one call, and this effectively prevents the agent from originating an outgoing call at the same time.

Wireline Call Origination

The compliance server may be based on modifying a predictive dialer so that it does not originate calls. However, in other embodiments, the compliance server may function as both a compliance server for wireless calls originated by the PBX, and a predictive dialer for originating calls to wireline numbers. In this case, the same or different phone at the agent's work space may be used for predictive dialer originated calls. In some embodiments, a dialing list may comprise both wireline and wireless numbers, and the processing of numbers on that list may involve a single agent handling wireline predictive dialing calls and wireless manual dialing calls. Thus, returning to FIG. 2, the compliance server 125 may be integrated with a predictive dialer that dials wireline numbers via facilities 121. In this case, the predictive dialer dials wireline numbers and performs compliance functions. When wireless numbers are dialed, the compliance server performs the compliance functions, and the PBX originates the wireless calls.

In other embodiments, originating calls to both wireline and wireless numbers can be accomplished by using a compliance server and PBX as described herein for originating wireless calls and a predictive dialer for wireline calls. To accomplish this, segregated lists of wireline and wireless numbers need to be prepared, loaded and managed for the predictive dialer and the compliance server respectively.

Process Flow

Figure 4A:
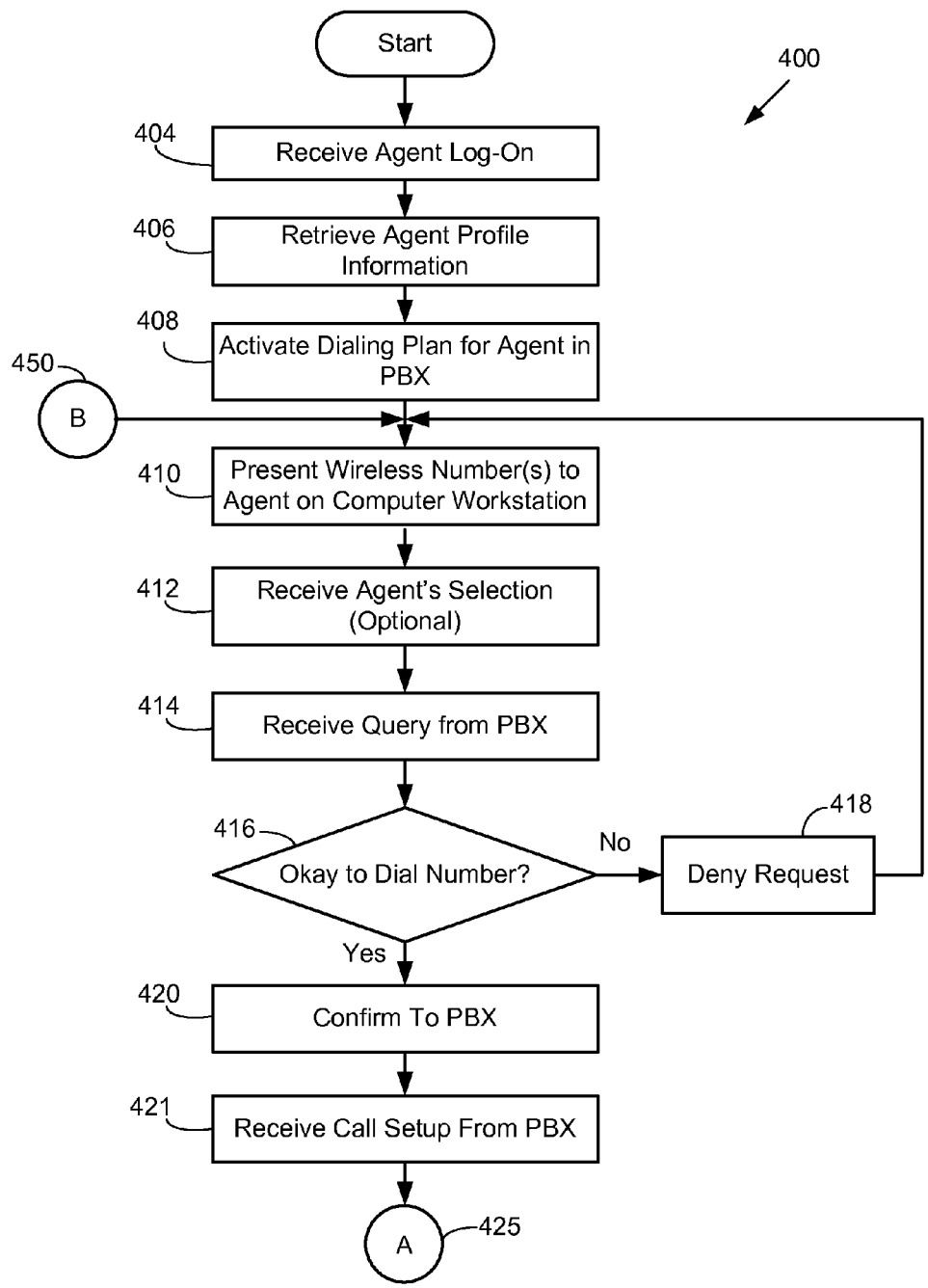
FIGS. 4A and 4B illustrate one embodiment of a process flow of the compliance server when used for providing compliance enforcement.
Figure 4B:
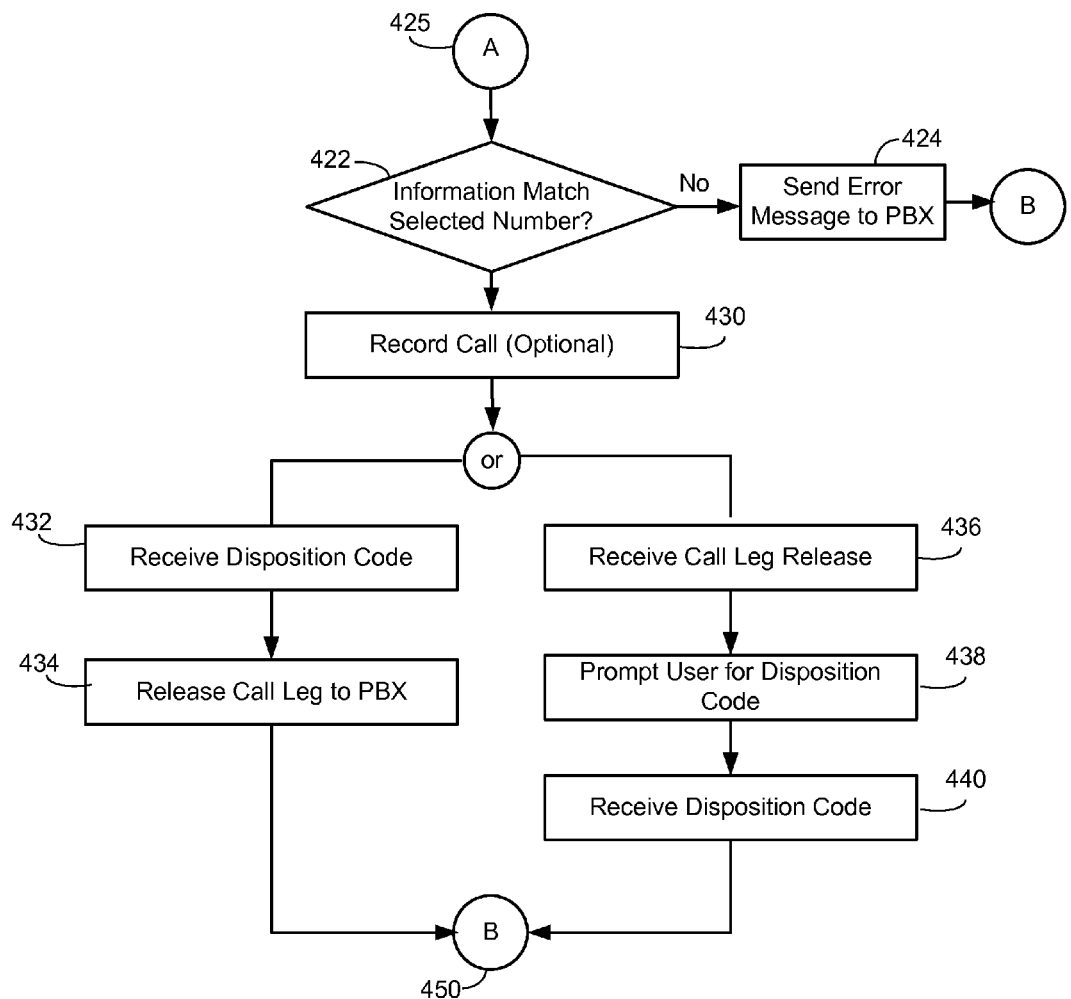

A process flow corresponding to the message flow of FIG. 3 is shown in FIGS. 4A and 4B. Turning to FIG. 4A, the process 400 begins with the compliance server receiving the agent's log-on in operation 404. The compliance server retrieves the agent's profile information in operation 406, and performs related operations, such as updating the status to reflect the agent is available to handle calls.

The compliance server may inform the PBX that the dialing plan procedures for the agent are to be activated in operation 408. This operation is optional, and may not occur in every embodiment. Next, the compliance server presents to the agent the wireless number(s) that may be dialed in operation 410. This may mimic the screen layouts used for dialing wireline numbers by a predictive dialer so that that agent sees the number in a familiar screen. Additional icons may inform the agent that the number is a wireless number that has to be dialed manually.

The compliance server receives the agent's selection of a number they will be dialing indicated by the agent via a mouse or cursor in operation 412. This operation is optional, as this provides an advance indication to the compliance server as to the number selected by the agent. The agent may simply dial the number using their phone that is signaled to the PBX, at which point the PBX sends a query to the compliance server. At operation 414, the compliance server receives the query from the PBX.

The compliance server determines in operation 416 whether it is okay for the PBX to originate the call to the number. The compliance server may have performed some compliance aspects previously, or may have waited until this point to perform the compliance testing. If the call is not in conformance with the requirements, then in operation 418 the compliance server denies the request.

Assuming that in operation 416 the call may be dialed, the compliance server may confirm to the PBX that the call may proceed in operation 420. The compliance server then updates the state information reflecting that it expects an incoming call will be shortly received from the PBX. The call is then received from the PBX in operation 421. The process continues to label A 425 on FIG. 4B.

Turning to FIG. 4B, the incoming call may indicate via the calling/called party number the wireless number dialed by the agent. This allows the compliance server to know that the incoming call correlates to the prior query. Other signaling mechanisms may be used. A check may be made in operation 422 to ensure that the query for the indicated wireless number matches the calling party number in the call setup. If not, then in operation 424 an error message may be sent to the PBX. If the wireless number is not indicated in the incoming call, then this step may be skipped or may be accomplished in a different manner.

Assuming there is a match in operation 422, the compliance server may monitor and/or record the call in operation 430. The compliance server may monitor the call process tones, analyze the conversation, record the speech, etc.

Once the agent completes the interaction with the called party, one of several options may be pursued. In one option, the compliance server receives a disposition code in operation 432 from the agent. If so, the compliance server then releases the call leg to the PBX in operation 434. The process then returns to label B 450 in FIG. 4A.

Another option is that the remote party will have released their call leg to the PBX. If so, the PBX may then release the call leg to the compliance server and the compliance server may receive an indication of such in operation 436. The compliance server knows that the call is completed, and may prompt the agent in operation 438 to enter a disposition code for the call that just ended. When it is received in operation 440, the compliance server then returns to the processing associated with label B 450 in FIG. 4A.

If the agent does not enter a disposition code, the compliance server may block the presentation of the next set of wireless numbers to the agent in operation 410, or reject a request from the PBX to establish a call for the agent in operation 416. Thus, the compliance server can track or shadow the status of the agent and the call as if the compliance server were originating the call, and indirectly control the establishment of further calls by the PBX.

Combined Wireless and Wireline Call Originations

In various embodiments, the compliance server may be configured to only originate calls to wireless numbers, or it may be configured to also originate calls to wireline numbers. It may be configured to originate calls to wireline numbers as described above, via manual dialing or in a predictive dialing mode.

If the compliance server 125 does predictively dial calls to wireline numbers using facilities 121, then the compliance server may function as a predictive dialer. In this case, the compliance server is accessing a list of numbers and dialing a call, but to a wireline number. If the list contains a wireless number, it can indicate this to the agent with instructions that the call is to be manually dialed. In this case, the compliance server presents the wireless number to the agent, and the agent uses the phone to dial the call via the PBX, such that the compliance server does not originate the wireless call in any way.

This embodiment also allows incoming calls to be handled. Returning to FIG. 2, the compliance server 125 can be integrated into an ACD that also receives incoming calls. As is well known for blended call center operations, when the agent is involved in an outgoing call, no incoming calls are offer to that agent. That is, any incoming calls received are only routed to the agent if the agent is not handling another call.

Embodiment Two

This embodiment also involves a PBX interacting with a compliance server. This embodiment is based on the compliance server originating a three-way call to the PBX, as opposed to the PBX originating a three-way call to the compliance server. The compliance server is able to monitor and record the call, but dialing of the call originates from the agent and is directed to the PBX with the dialed digits handled by the compliance server in some embodiments.

In one embodiment, the compliance server may incorporate aspects of preview dialing in presenting the number to the agent to dial. Preview dialing selects one or more account records and presents various information on the account record(s) to the agent for review. Thus, the agent can "preview" the information before the call is originated. The agent can select a record and then control when the call is originated by selecting a screen icon, pressing a key, or some other form of input. The telephone number associated with the record is then dialed. In one embodiment, the compliance server may then provide the digits to the PBX to dial.

The modifications ensure that the call is established by the agent interacting with the PBX, and that the PBX does not store, produce or otherwise access a database of numbers when originating the call. Recall that in Embodiment One, the agent's phone is connected to the PBX, and the PBX creates a three-way call to the compliance server, allowing the compliance server to receive audio and process and/or record audio data as necessary. In this embodiment, the compliance server creates the three-way call.

Referring back to FIG. 2, in Embodiment Two, the agent's phone 161 may be connected to the compliance server 125 via facility 132, and the compliance server bridges or connects a call leg to the PBX using facility 127. If the compliance server needs to add on a recording system to record the audio, then a bridge may be required in the compliance server to bridge a call leg to an external recording system. If the compliance server does not need to connect to an external recording system, than a bridge may not be required. In this case, the facility 132 to the agent's phone is connected to the PBX via facility 127. In one embodiment, the agent's phone 161 generates the DTMF tones (or these may be generated by a tone generator in the computer 160 responsive to the phone 161) representing the wireless number. The information is conveyed over facility 132, through the compliance server and over facility 127 to the PBX 135, and the PBX originates the call as in the earlier embodiment. In other embodiments, the phone may pass signaling information (e.g., SIP or ISDN signaling messages) as opposed to in-band tones to the compliance server 125 that, in turn, relays the signaling to the PBX or passes it through to the compliance server such that the signaling is processed by the PBX.

In other embodiments, the agent may request the compliance server send the number to be dialed to the PBX, and the compliance server then connects the agent to the PBX. In this last embodiment, the phone does not send the wireless number over the facility 132. In each of these embodiments, the compliance server retains its functionality of ensuring compliance is enforced and that the PBX originates the calls.

Figure 5:
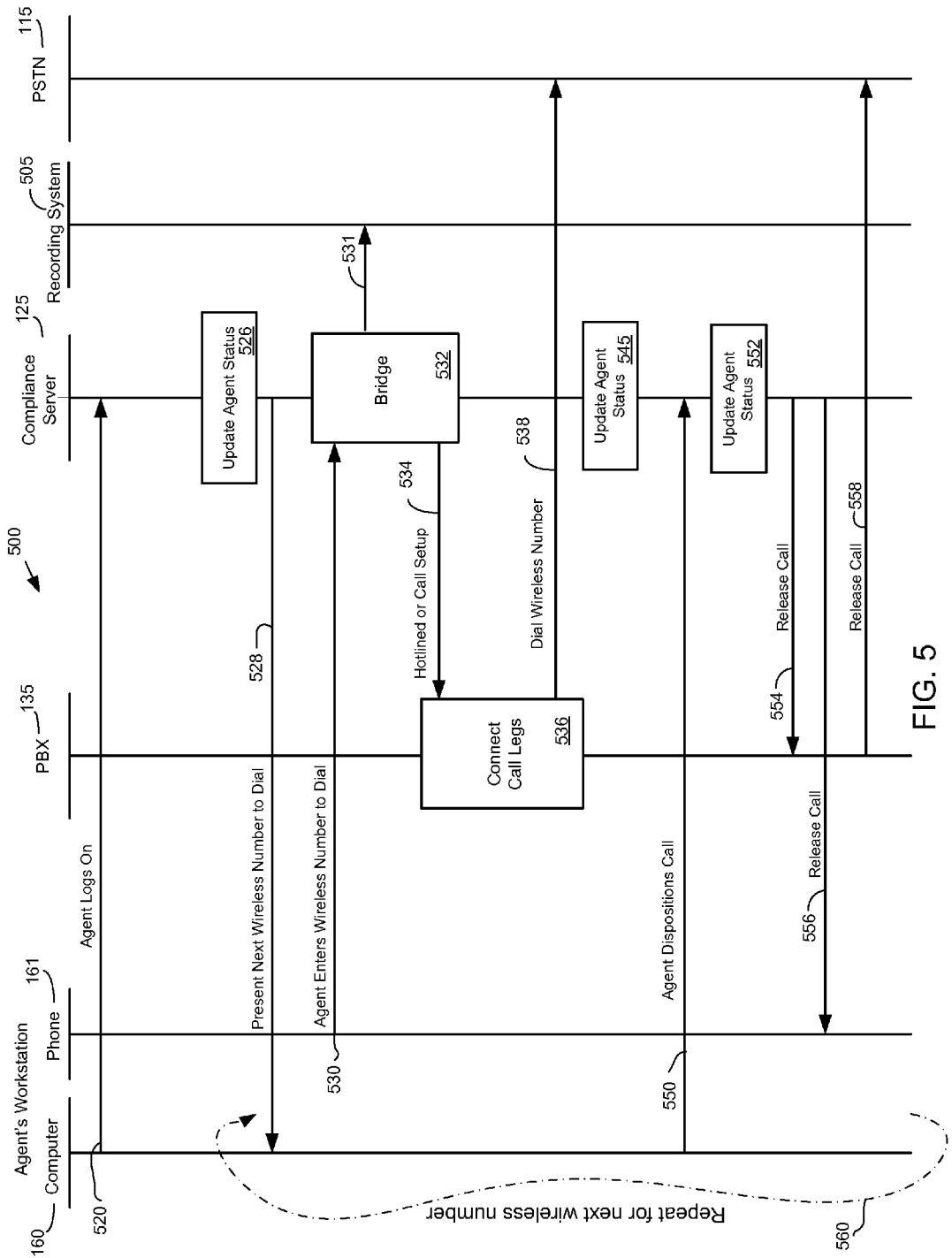
FIG. 5 illustrates another embodiment of a message flow between various components for providing compliance enforcement when originating a call to a wireless number.

A message flow 500 of this embodiment is shown in FIG. 5. The process begins in operation 520 with the agent logging into the compliance server 125 using their computer 160. In some embodiments, additional messaging may follow where the compliance server activates agent-specific functionality in the PBX, but these messages are not shown in this embodiment. The compliance server is able to then update the agent's status in operation 526. Next, the compliance server transmits to the agent's computer the next wireless number(s) that are to be dialed in operation 528. After reviewing the number(s) and related account information, the agent enters the number to be dialed via their phone 161 in operation 530.

The agent can indicate the number to dial by manually dialing the digits or by selecting a number in conjunction with a preview capability. The compliance server then establishes a three-way bridge 532 that connects the agent to a recording system 505 at operation 531, and the PBX 135 at operation 534. The recording system is shown as a separate entity in FIG. 5 in order to illustrate various options.

The manner in which the call leg between the compliance server and the PBX is established may vary. In one embodiment, the compliance server hotlines (automatically connects) the call leg to the PBX. The compliance server effectively connects the call leg to the agent's phone to the call leg to the PBX. Thereafter, the PBX may provide audio tones and receive the dialed digits from the agent. Although these inband tones or out-of-band signaling messages may be relayed by and through the compliance server, the compliance server is not establishing the call.

In another embodiment, when the agent selects the number to dial at operation 530, the compliance server connects to the PBX and sends the digits to the PBX. In this case, the digits to be dialed are conveyed by the compliance server to the PBX, but the call origination is performed by the PBX.

The PBX connects in operation 536 the call leg from the compliance server with the call leg established for the originating wireless call leg in operation 538. Alternatively, the originating wireless call leg in operation 538 can be established and then connected to the call leg between the PBX and compliance server. In any case, a connection is established from the agent, to the compliance server, back to the PBX, and then out to the PSTN 115 and the called party. The compliance server is aware that the call has been established and then updates the agent status information in operation 545. As before, the compliance server is able to monitor and record the audio associated with the call progress as well as any conversation.

When the agent is finished talking with the called party, the agent dispositions the call by signaling the disposition code to the compliance server at operation 550. The compliance server updates the agent status as appropriate in operation 552 and then may release the call leg back to the PBX in operation 554. The compliance server may also release the call leg to the agent in operation 556. The PBX, in response to the call leg released in operation 554, releases the call leg to the called party in operation 558. The process may loop back in operation 560 and repeat as necessary.

Process Flow

Figure 6:
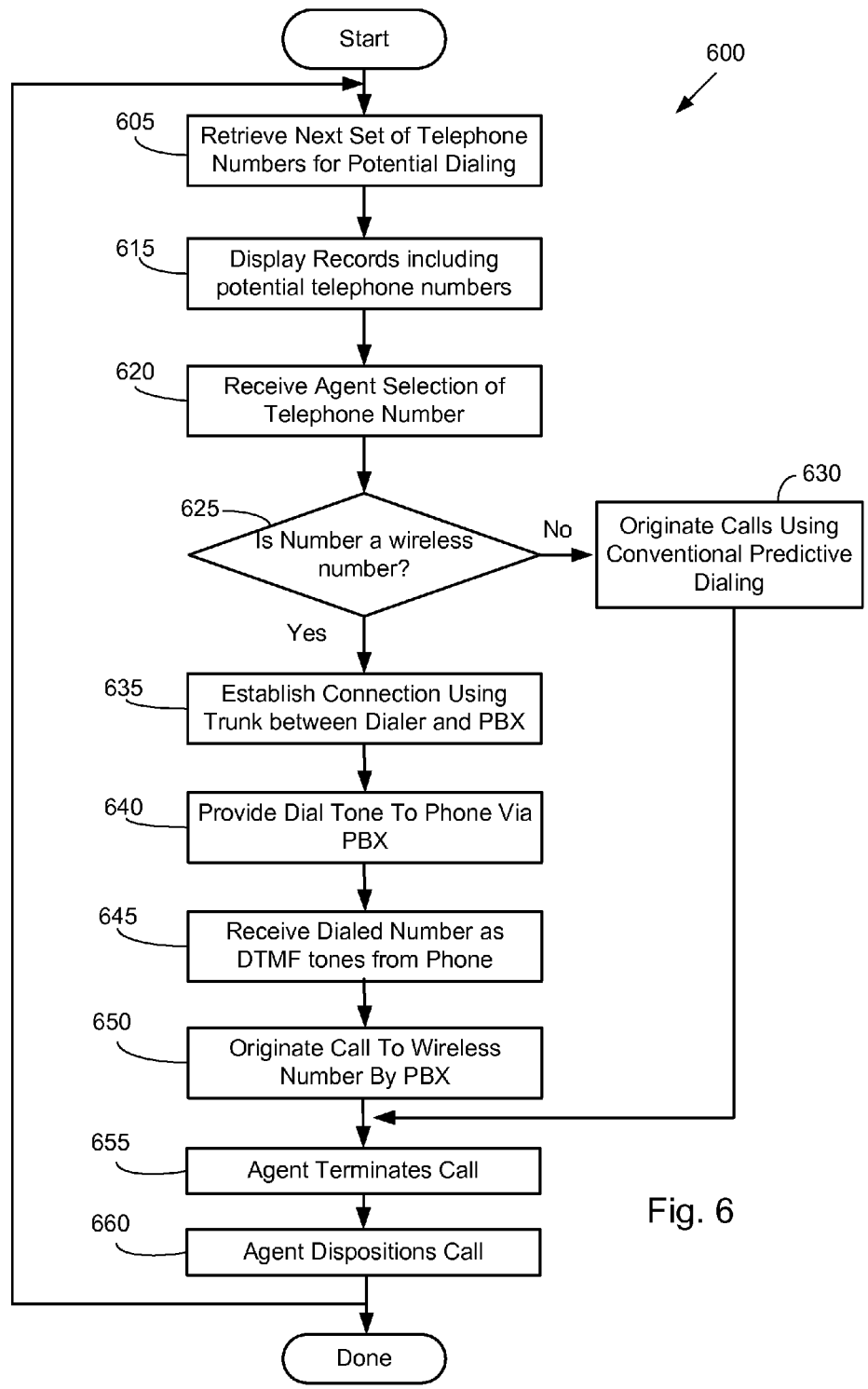
FIG. 6 illustrates another embodiment of a process flow of the compliance server when used for providing compliance enforcement.

The process flow corresponding to the message flows of FIG. 5 is shown in FIG. 6. This embodiment presumes that a single list comprising both wireline and wireless numbers is processed by the compliance server. In other embodiments, different lists may exist, one for wireline and one for wireless. In the case where the list only comprises wireless numbers, the process flow may be slightly different from that shown in FIG. 6. Specifically, operations 625 and 630 may be absent.

The process 600 begins in operation 605 with the compliance server retrieving the next set of telephone numbers in the dialing list for potential dialing. In this embodiment, a group of records are retrieved; however, in other embodiments, only a single record may be retrieved. This operation may be the point of re-entry when repeating the overall process.

Next, the compliance server displays the retrieved records on the computer of the agent in operation 615. A number of graphical user interface formats may be used to present the information, which may include other account information associated with the telephone number(s). Presumably, if the numbers are of either a wireless or wireline type, an indication of each type of number is provided to the agent. This operation allows the agent to determine which number from the various accounts is to be dialed next. The compliance server may have performed various compliance processing prior to displaying the records to the agent. That is, in one embodiment the fact that the number is presented to the agent by the compliance server means that the number is eligible to be dialed, if so chosen by the agent. In other embodiments, the number displayed is not checked for compliance until the agent identifies the number that the agent would like to dial.

The agent selects one of the telephone numbers presented by the compliance service and the compliance server receives the selected number in operation 620. The agent may identify their selection by using a pointing device, mouse, touch screen, keyboard, etc. The selection could be identifying the numbers individually or selecting the number as a whole.

The next operation is a test, which presumes that the list incorporates both wireless and wireline numbers. If the list only comprises wireless numbers, then this test would not be required. The test in operation 625 determines if the selected number is a wireless number. If not (e.g., a wireline number), then the compliance server may function as a preview dialer and originate the call. In many embodiments, the list will only contain wireless numbers since it further avoids dialing wireline numbers in a manual manner similar to wireless numbers. Thus, in some embodiments, the dialing list is not integrated with wireline and wireless numbers, since inefficiencies are introduced when dialing wireline numbers individually.

If the number is a wireless number in operation 625, then the compliance server establishes a connection between the agent's phone and the PBX using the facility 127 between the PBX 125 and compliance server 135. This facility could be analogous to a tie trunk between the two, which is a permanent connection for voice, or a data connection. The agent's phone is connected to the compliance server, and connects the agent to the PBX. In one embodiment, the agent is connected to a tone receiver in the PBX. In this case, the agent may dial the wireless number to the PBX, although the information may be relayed through the compliance server. In another embodiment, the compliance server may transmit the dialed digits to the PBX. A bridge may be present in the compliance server so as to monitor and record the progress of the call.

For purposes of illustration, it is presumed that the compliance server connects the agent to the PBX that then allows the agent to originate the call by the PBX. In operation 635, the facility 127 is used to connect the agent to the PBX. Next, the PBX may provide dial tone back to the agent's phone in operation 640. The agent, in response, manually dials the number displayed on the computer screen using the appropriate man-machine interface provided according to the type of phone in operation 645, which are received by the PBX. In some embodiments, this may be a soft phone and the agent may use the numeric keypad on the computer keyboard to enter the wireless telephone number. Depending on the embodiment, the agent may enter a "return," "enter," or "send" to signify the end of the digits. In other embodiments, the PBX may employ timers or digits counters. In one embodiment, DTMF tones are generated by the soft phone to indicate the digits pressed by the agent. In other embodiments, the soft phone may originate SIP signaling which is conveyed to the PBX.

At this point, the compliance server is maintaining a connection between the agent soft phone and the PBX. Thus, the compliance server can monitor the in-band information and determines the DTMF digits being dialed by the agent to the PBX. In this manner, the compliance server is able to monitor the status of the call and any audio data being conveyed. Further, the agent's phone is interacting with the PBX for originating a call, not the compliance server.

The PBX originates the call in operation 650 in a conventional manner. After conversing with the called party, the agent may then terminate the call in operation 655 (or the called party may terminate the call). The compliance server may not know that the call is terminated. However, the agent then dispositions the call by indicating the appropriate disposition code using the workstation computer in operation 660. The compliance server, by receiving the disposition code, knows that the call has ended, and can appropriately update the status of the account and disconnect the agent's phone to the trunk. The PBX may then release any remaining call legs associated with the conference.

The compliance server is able to maintain status information for the agent and/or call in that the agent indicates the number selected. Thus, the compliance server knows to connect the agent's phone with the PBX. The compliance server is able to monitor the dialed number indicated by DTMF tones, and know that the called party is being dialed. Further, the compliance server knows the call is over when the agent dispositions the call. Thus, even though the compliance server is not processing or originating the call to the wireless number, it is aware of the general status via the agent's indications. As with the previous embodiment, the agent originates calls to the PSTN via the PBX, not the compliance server.

Maintaining Agent State Information

In both embodiments, the compliance server tracks the agent's status. "Agent status" covers various status information related to the agent and/or the call, including the status of their desktop space, their log-in status, their call origination status, call progress, call disposition status, etc. It may include status about the agent as reflected by the computer as well as reflected by the wireless call progress. In regard to the agent's workstation computer, the compliance server knows when the agent is logged-in and ready to initiate another wireless call. The compliance server knows if one or more numbers have been presented to the agent for dialing, and whether the agent has selected one for dialing. The compliance server is able to monitor the progress of a call and determine whether it has been answered, encountered busy, disconnected, or answered by an answering machine. Further, the compliance server also knows if and when the agent has dispositioned a call after the call is completed. The compliance server also knows if a call leg is released by the PBX. With this information, the compliance server knows when the agent is available to be presented with additional numbers to dial. For example, if the agent has not yet dispositioned a call that has completed, then the compliance server will prevent the agent from initiating another wireless call. If the agent attempts to do so, the compliance server can display appropriate messages requesting them to disposition the previous call and can block the PBX from originating further calls.

With respect to the call originated by the agent, although the compliance server does not originate the call, it is able to maintain call state information about the status of the call. In some embodiments, the call state information is very precise. Specifically, in Embodiment One, the compliance server receives a request from the PBX, so that the compliance server knows that a call is attempted to a specified destination. Further, the compliance server then receives a call leg from the PBX. This may be set up just before or just after the call leg to the agent and/or the called party is established. The compliance server thus has an accurate perspective of when the call was originated by the PBX, and may know by monitoring the in-band channel whether the call was answered by a human, answering machine, or received intercept treatment. Similarly, in Embodiment Two, the compliance server can also monitor in-band tones to maintain a precise and accurate status of the call.

Because the compliance server is able to maintain information about both the agent's actions with respect to the agent's workstation computer and the call status, the compliance server is able to maintain detailed information about the agent's actions, work statistics, error handling, call progress, call statistics, and perform other aspects necessary to monitor agent performance. The compliance server is also able to know and update call establishment information to accurately ensure compliance regulations are followed. For example, because the compliance server knows whether a call originated by the agent encounters a no-answer condition, the compliance server is then able to ensure that the number is not re-dialed within a prohibited window. If the compliance server was unable to ascertain the status of the call attempt, it would adversely impact the ability of the compliance server to ensure calls were compliant.

Embodiment Three

The embodiments disclosed above are generally based on the architecture shown in FIG. 2. The architecture of FIG. 2 can be implemented using co-located components, geographically separated components, or hosted components provided whole or in part by a service provider.

Figure 7:
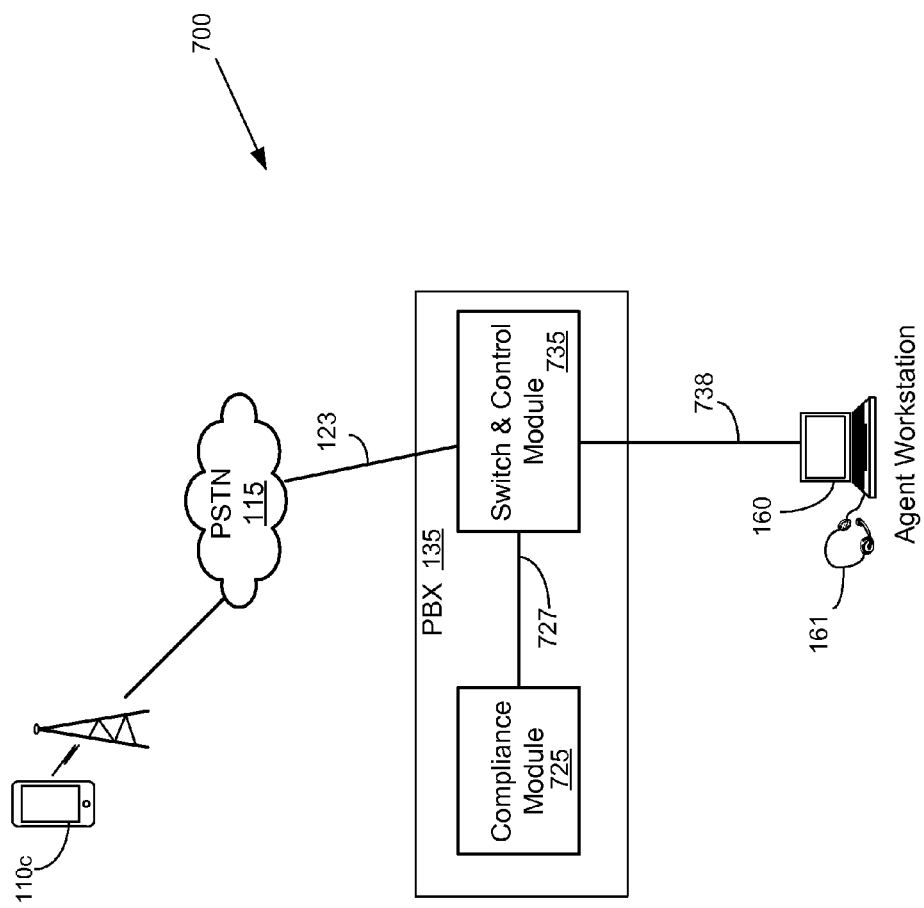
FIG. 7 illustrates another embodiment of an architecture comprising a PBX in a contact center used for providing compliance enforcement when an agent originates a call to a wireless number.

Another embodiment is shown in FIG. 7. In FIG. 7, the architecture 700 illustrates the mobile smart phone 110c, which is shown as interconnected to the PSTN 115, which in turn is connected via facilities 123 to a PBX 135. In this embodiment, the PBX 135 comprises a switch and control module 735 and a compliance module 725. The switch and control module 735 may be an open source switching fabric and control software, or other form of switching and control capabilities. The switch and control module 735 is able to communicate over data link 727 to the compliance module 725, that is configured to provide compliance control enforcement. This embodiment incorporates the functionality of the compliance server into a PBX and thus avoids having to use two separate processing devices. The compliance module 725 and the switch and control module 735 may execute on the same processor, or on different processors, which can be executing within a common processing system. The facilities 727 may be a signaling link, so that that information about the wireless number, and whether the call is allowed to proceed is indicated via a signaling link, and no conference call leg is established between the switch and control module 735 and the compliance module 725. The agent may use a workstation comprising a computer 160 and a softphone 161 which are connected to the PBX 135 via facilities 738. The facilities 738 may carry data as well as digitized voice.

Figure 8:
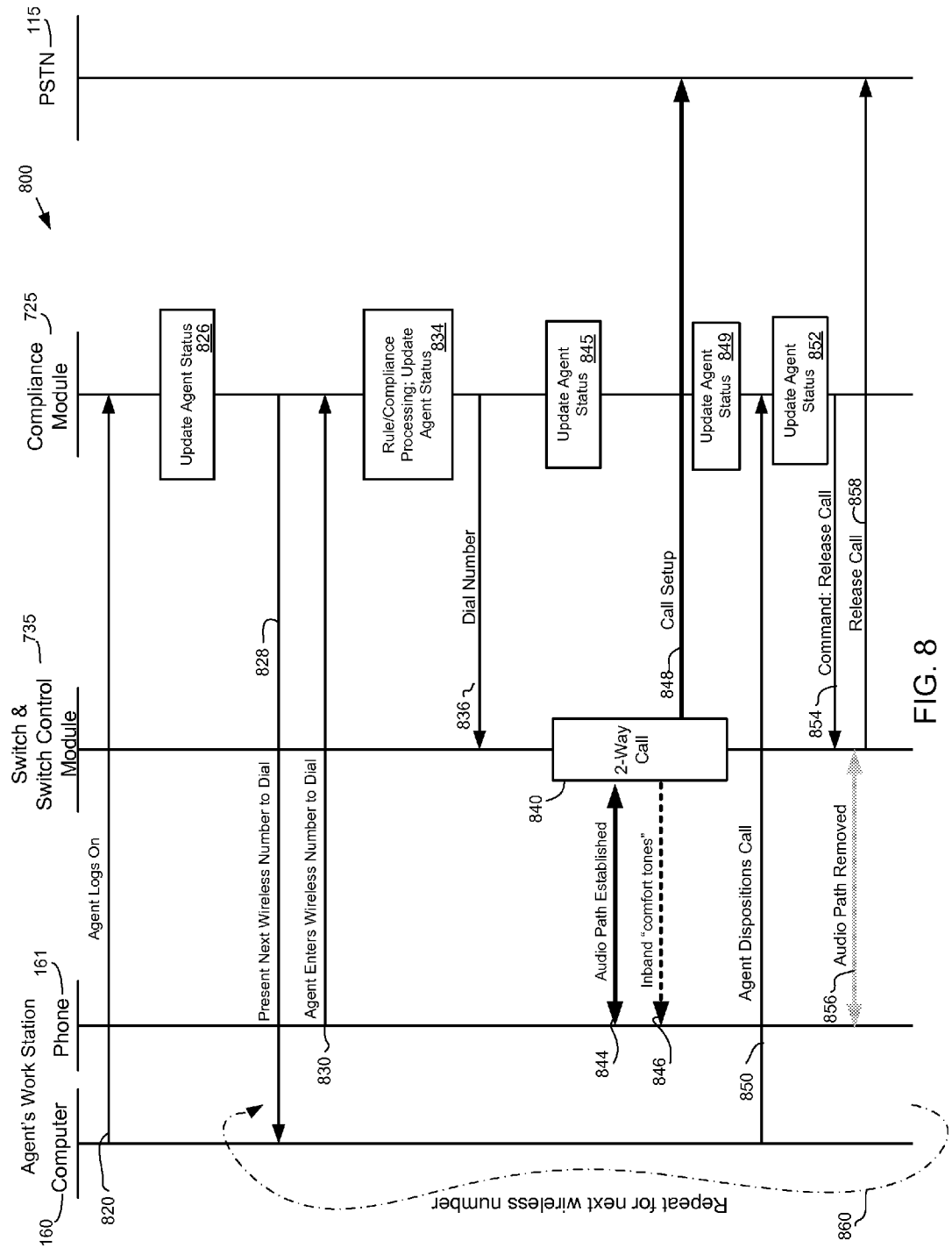
FIGS. 8-9 illustrate additional embodiments of a message flow between various components for providing compliance enforcement when originating a call to a wireless number

In operation, the messaging flow may be as shown in FIG. 8. In FIG. 8, the messaging diagram 800 shows the agent's workstation comprising the computer 160 and phone 161. Further illustrated are the switch and control module 735, the compliance module 725, and the PSTN 115.

The process may begin with the agent logging onto the compliance module 725 in operation 820 using their computer 160. The compliance module 725 now knows that the agent is available to dial a call, and may update agent status information in operation 826. Next the compliance module 725 may present the next wireless number for the agent to dial in message 828. This step may be optional, in that the compliance module may not offer the wireless number to dial, but simply receive the wireless number to dial in message 830.

Once the compliance module receives the number to dial, then in operation 834 it performs the appropriate compliance processing to ensure that the call originating to the wireless number meets all the compliance requirements. If so, then in message 836 the compliance module 725 informs the switch and control module 735 to originate the call for the indicated agent by dialing the number.

The switch and control module 735 receives the message 836 and establishes an audio path 844 with the agent's phone and connects this with the call being established in message 848 using a conventional 2-way switching resource 840. During the call set up process, various in-band so-called comfort tones may be provided to the agent in operation 846, so as to provide an indication to the agent of the call progress. Assuming the called party answers the call setup in message 848, the agent is connected to the called party.

During each step, the compliance module 725 may update information about the status of the call and/or agent, in operations 845 and 849. The compliance module knows when a call is originated, the call's status, whether the agent is waiting for the call to connect to the called party, etc.

After the agent and the called party complete their conversation, the agent dispositions the call in operation 850. Dispositioning the call indicates to the compliance module that the agent has completed the call, and the compliance module sends a command in message 854 to the switch and control module 735 to release the call to the agent and the called party. In operation 856 the audio path to the agent's phone is removed or otherwise the call leg is disconnected, and similarly the call leg to the wireless call party is released in message 858.

Embodiment Four

Figure 9:
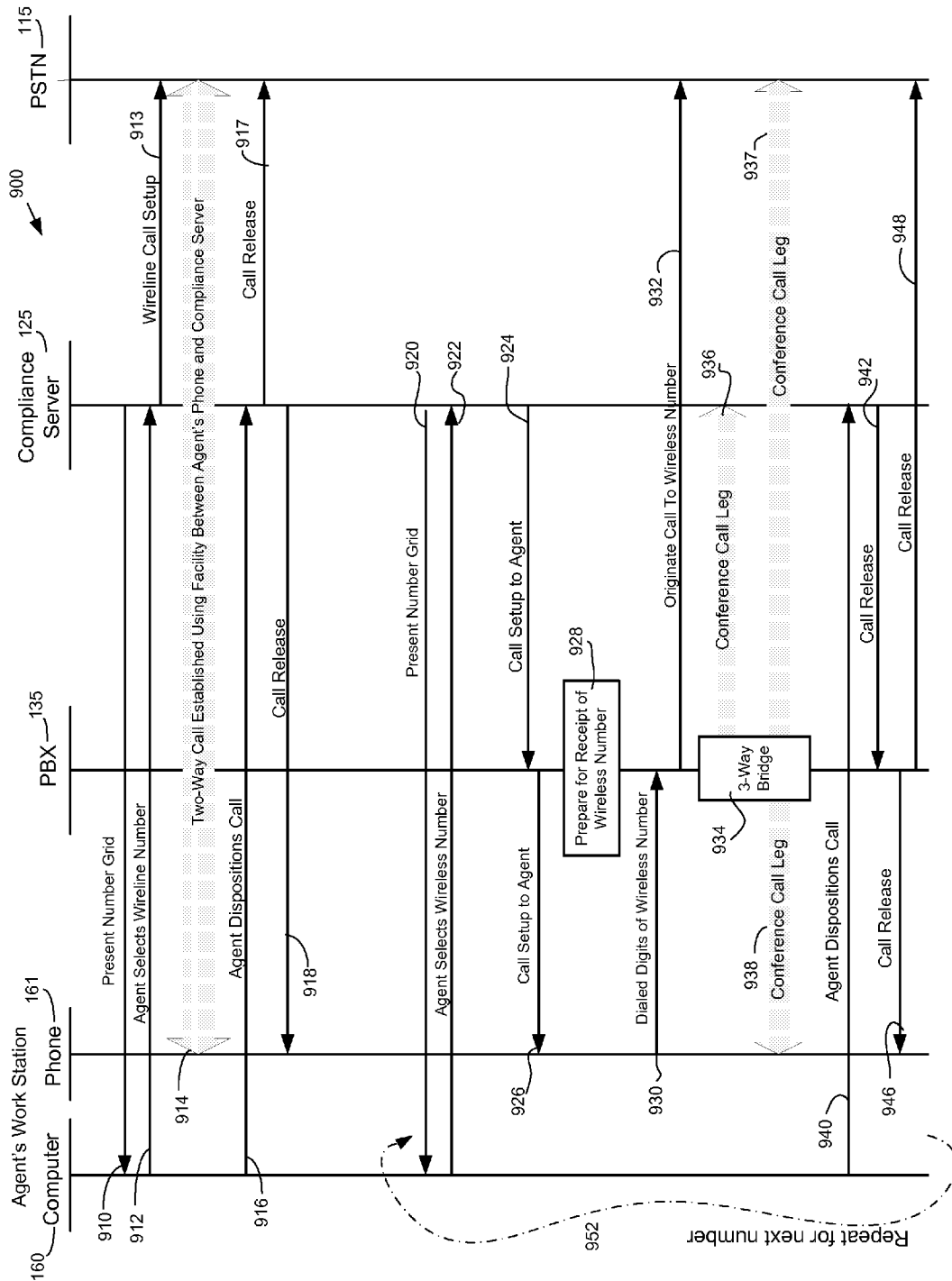

Another embodiment is shown in FIG. 9. At a high level, this embodiment is based on the compliance server originating a call to the agent's phone through the PBX. The agent then indicates the wireless number to the PBX, which then originates a call leg to the wireless number and creates a conference call. More specifically, the call leg to the wireless number is added to the call between the compliance server and the agent. This allows the PBX to monitor the progress/status of the call.

Furthermore, this embodiment allows the compliance server to function as a predictive dialer when the number to be dialed is a wireline number and function as a compliance server if the number is a wireless number.

Turning to FIG. 9, the messaging diagram 900 illustrates in messages 910-918 the messaging that occurs if the number to be dialed is a wireline number. Later, messages 920-948 will be reviewed, and this illustrates the messaging that occurs if the number to be dialed is a wireless number. For sake of simplicity, the various operations in the compliance server where it is able to update the agent's/call's status is not shown in FIG. 9, as it was shown in the previous diagrams.

In operation, the agent may be presented with a number grid as shown in message 910 that may present various accounts and the numbers associated therewith. An agent may view the list and indicate the particular number they plan to dial. This is reflected in message 912 between the agent's computer and the compliance server 125. Because the number selected is a wireline number, the compliance server, operating as a dialer, originates the call leg to the wireline number in message 913. A second call 914 is then established between the agent's phone 161 and the called party. After the call is completed, the agent may disposition the call in operation 916 to the compliance server, which then releases the call leg in message 917 to the called party, and the compliance server also releases the call leg to the agent's phone in message 918.

This process may be repeated, if the next number selected by the agent is a wireline number. This mode of dialing can be preview dialing. Other embodiments may utilize other types of dialing appropriate for dialing wireline numbers.

Next, the processing of a wireless number is examined. Again, the agent is presented in message 920 a grid of numbers, from which the number to dial is selected in message 922. The selected number is a wireless number, and if the agent is not already aware of this, the compliance server may inform the agent via a message on the computer display that the number is a wireless number and must be manually dialed.

After the agent indicates to the compliance server that the wireless number they have selected in message 922, the compliance server 125 will establish a call using messages 924 and 926 through the PBX 135 to the agent's phone. This results in a voice connection between the compliance server and the agent's phone. In some embodiments, the compliance server may provide an audible announcement to remind the user to dial the wireless number. The announcement could be, e.g., "Please dial 404 555 1212". This would correspond to the same wireless number previously selected by the agent in message 922.

This call that is established through the PBX is slightly different than a conventional call, in that the PBX is expecting to receive the wireless number from the agent, and will use that to establish a conference call and a call leg to that number and then join that call leg to the established call. This type of conference bridge allows the agent, as the answering party, to request a conference call. Consequently, in operation 928 the PBX prepares or expects to receive the wireless number from the agent. The wireless number may be transmitted via DTMF tones, SIP INFO messages, or some other form as is well known to those skilled in the art, in message(s) 930. The PBX must know that it should process the wireless number accordingly. Thus, for example, if DTMF tones are used by the agent to convey the wireless number, the PBX would have to attach a DTMF receiver to monitor those tones.

The PBX upon receipt of the wireless number from the agent's phone then originates a call leg to the wireless number in message 932. This is bridged on using a 3-way bridge in operation 934. The bridging of the wireless call leg can occur before the wireless call leg is originated or just after the wireless call leg is originated. In either case, the result shown is a three way call with call leg 938 between the agent and the 3-way bridge 934, a call leg 936 between the compliance server and 3-way bridge, and a call leg 937 between the wireless party and the 3-way bridge. This arrangement allows the compliance server to record all aspects of the call from the origination of the wireless call leg, including any DTMF tones originating from the agent's phone (or comfort tones provided to the agent), and call progress tones, announcements, etc.

As in the other embodiments, the call legs may be released in various ways. In the illustrated embodiment, the agent dispositions the call in message 940, which is received by the compliance server. In turn, the compliance server releases the call leg to the PBX, and the PBX will release the call leg to the agent's phone. The process may repeat 952 back to the next wireless number, as shown in FIG. 9 (but, which could also be a wireline number, which is not depicted in FIG. 9).

Exemplary Processing Device Architecture

Figure 10:
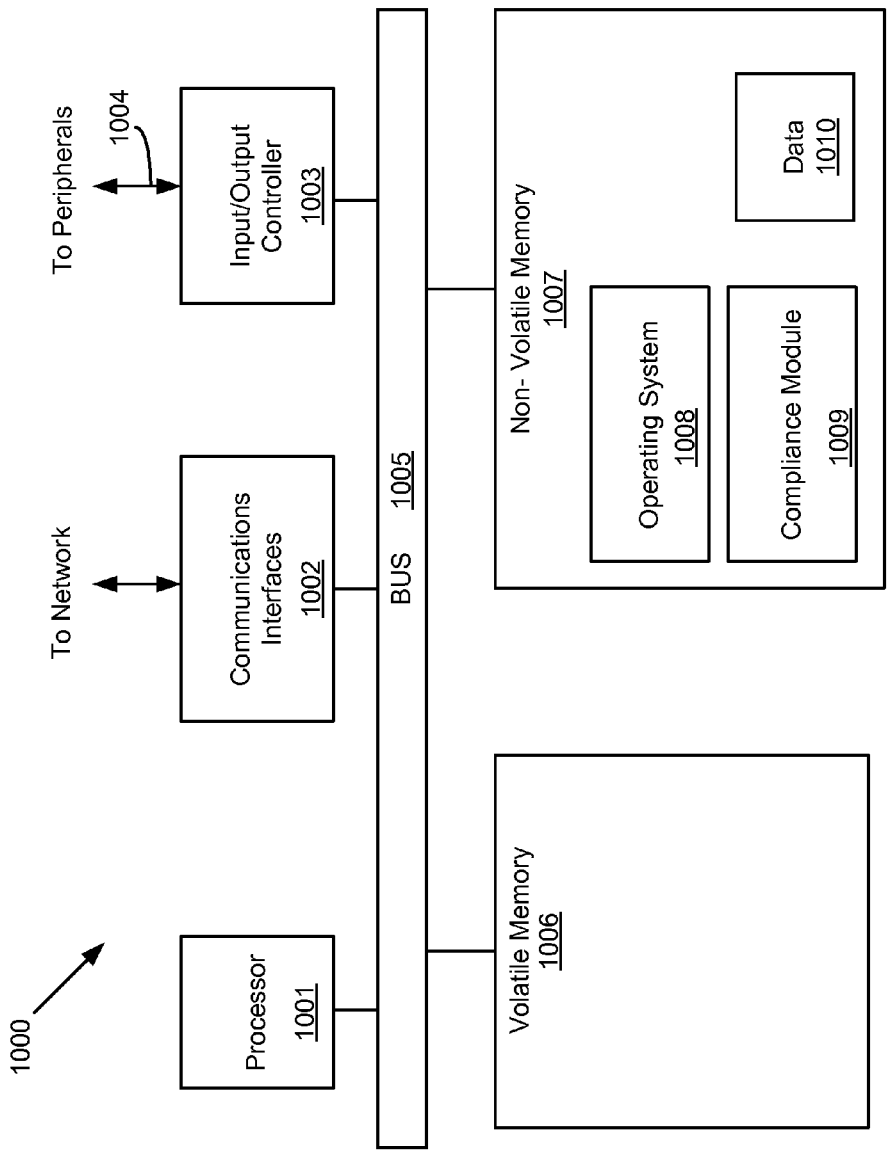
FIG. 10 illustrates one embodiment of a system architecture of a compliance server or a PBX used to embody the concepts and technologies disclosed herein.

FIG. 10 is an exemplary schematic diagram of a processing system 1000 that may be used in an embodiment to practice the technologies disclosed herein, such as the PBX 135 or the compliance server 125. In general, the term "processing system" may be exemplified by, for example, but without limitation: a personal computer, server, desktop computer, tablets, smart phones, notebooks, laptops, distributed systems, servers, blades, gateways, switches, and the like, as well as any combination of devices or entities adapted to perform the functions described herein.

As shown in FIG. 10, the processing system 1000 may include one or more processors 1001 that may communicate with other elements within the processing system 1000 via a bus 1005. The processor 1001 may be implemented as one or more complex programmable logic devices ("CPLD"), microprocessors, multi-core processors, digital signal processors ("DSP"), system-on-a-chip ("SOC"), co-processing entities, application-specific integrated circuits ("ASIC"), field programmable gate arrays ("FPGA"), programmable logic arrays ("PLA"), hardware accelerators, other circuitry, or the like.

In one embodiment, the processing system 1000 may also include one or more communications interfaces 1002 for communicating data via the local network with various external devices. In other embodiments, communication may be via wired, optical, or wireless networks (or a combination thereof). The communication may use a variety of data transmission protocols, such as fiber distributed data interface (FDDI), Ethernet, asynchronous transfer mode ("ATM"), or frame relay.

The input/output controller 1003 may also communicate with one or more input devices or peripherals using an interface 1004, such as, but not limited to: a keyboard, a mouse, a touch screen/display input, microphone, pointing device, etc. The input/output controller 1003 may also communicate with output devices or peripherals, such as displays, printers, speakers, headsets, banner displays, etc.

The processor 1001 may be configured to execute instructions stored in volatile memory 1006, non-volatile memory 1007, or other forms of computer-readable storage media accessible to the processor 1001. The volatile memory 1006 may comprise various types of memory technologies, including, but not limited to: random access memory ("RAM"), dynamic random access memory ("DRAM"), static random access memory ("SRAM"), and other forms well known to those skilled in the art. The non-volatile memory 1007 may comprise various technologies, including, but not limited to: storage media such as hard disks, floppy disks, read only memory ("ROM"), programmable read only memory ("PROM"), electrically erasable read only memory ("EPROM"), flash memory, and other forms well known to those skilled in the art.

The non-volatile memory 1007 may store program code and data, which also may be loaded into the volatile memory 1006 at execution time. Specifically, the non-volatile memory 1007 may store one or more computer program modules, such as a compliance module 1009 containing instructions for performing the process and/or functions associated with the technologies disclosed herein, and related data 1010, and/or operating system code 1008. In addition, the compliance module 1009 may generate or access the data 1010 in the non-volatile memory 1007, as well as in the volatile memory 1006. The volatile memory 1006 and/or non-volatile memory 1007 may be used to store other information including, but not limited to: records, applications, programs, scripts, source code, object code, byte code, compiled code, interpreted code, machine code, executable instructions, or the like. These may be executed or processed by, for example, the processor 1001. These may form a part of, or may interact with, the compliance module 1009 and/or data 1010.

The technologies described herein may be implemented in various ways, including as computer program products comprising memory storing instructions causing a processor to perform the operations associated with the above technologies. The computer program product comprises a tangible, non-transitory computer readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms). Such tangible, non-transitory computer readable storage media include all the above identified media (including volatile and non-volatile media), but does not include a transitory, propagating signal. Non-volatile computer readable storage medium may specifically comprise: a floppy disk, flexible disk, hard disk, magnetic tape, compact disc read only memory ("CD-ROM"), compact disc compact disc-re- writable ("CD-RW"), digital versatile disc ("DVD"), Blu-ray™ disc ("BD"), any other non-transitory optical medium, and/or the like. Non-volatile computer-readable storage medium may also comprise read-only memory ("ROM"), programmable read-only memory ("PROM"), erasable programmable read-only memory ("EPROM"), electrically erasable programmable read-only memory ("EEPROM"), flash memory, and/or other technologies known to those skilled in the art.

CONCLUSION

Many modifications and other embodiments of the concepts and technologies set forth herein will come to mind to one skilled in the art having the benefit of the teachings presented in the foregoing descriptions and the associated drawings. Therefore, it is to be understood that embodiments other than the embodiments disclosed herein are intended to be included within the scope of the appended claims. Although specific terms may be employed herein, they are used in a generic and descriptive sense only and not for purposes of limitation.

The invention claimed is:

1. A system for ensuring compliance adherence for a call to be placed to a called party from a contact center using a wireless telephone number, the system comprising:
   a private branch exchange configured to:
      send a query in response to receiving an indication that an agent of the contact center has originated the call to the called party by dialing the wireless telephone number using a phone device; and
   a compliance server configured to:
      provide the wireless telephone number to the agent of the contact center prior to the agent originating the call to the called party;
      receive the query;
      determine whether the call is compliant with respect to at least one compliance requirement; and
      in response to determining the call is compliant, provide an authorization to the private branch exchange to place the call to the called party, wherein:
      upon receiving the authorization from the compliance server, the private branch exchange places the call to the called party by using the wireless telephone number and connects the call with the phone device being used by the agent of the contact center.

2. The system of claim 1, wherein the at least one compliance requirement comprises a maximum number of attempts to place the call to the called party over a particular time period.

3. The system of claim 1, wherein the compliance server is configured to place a second call to a second called party using a telephone number in response to determining the telephone number is a wireline telephone number.

4. The system of claim 1, wherein the private branch exchange is configured to provide the compliance server with a status of the call placed to the called party.

5. The system of claim 1, wherein the indication that the agent has originated the call comprises the agent manually dialing digits on the phone being used by the agent corresponding to the wireless telephone number.

6. The system of claim 5, wherein the compliance server is configured to determine the digits dialed by the agent correspond to the wireless telephone number prior to providing the authorization to the private branch exchange.

7. The system of claim 1, wherein the indication that the agent has originated the call comprises the agent selecting the wireless telephone number on a display being used by the agent.

8. A method for ensuring compliance adherence for a call to be placed to a called party from a contact center using a wireless telephone number, the method comprising the steps of:
   providing the wireless telephone number to an agent of the contact center by a compliance server prior to the agent originating the call to the called party;
   sending a query from a private branch exchange in response to receiving an indication that the agent has originated the call to the called party by dialing the wireless telephone number using a phone device;
   receiving the query by the compliance server;
   determining by the compliance server whether the call is compliant with respect to at least one compliance requirement;
   in response to determining the call is compliant, providing an authorization by the compliance server to the private branch exchange to place the call to the called party; and
   upon receiving the authorization from the compliance server:
      placing the call by the private branch exchange to the called party by using the wireless telephone number; and
      connecting the call with the phone device being used by the agent of the contact center.

9. The method of claim 8, wherein the at least one compliance requirement comprises a maximum number of attempts to place the call to the called party over a particular time period.

10. The method of claim 8 further comprising the steps of:
   determining by the compliance server a second telephone number is a wireline telephone number; and
   placing a second call by the compliance server to a second called party using the second telephone number in response to determining the second telephone number is a wireline telephone number.

11. The method of claim 8 further comprising the step of providing the compliance server with a status of the call placed to the called party by the private branch exchange.

12. The method of claim 8, wherein the indication that the agent has originated the call comprises the agent manually dialing digits on the phone being used by the agent corresponding to the wireless telephone number.

13. The method of claim 12 further comprising the step of determining the digits dialed by the agent correspond to the wireless telephone number by the compliance server prior to providing the authorization to the private branch exchange.

14. The method of claim 8, wherein the indication that the agent has originated the call comprises the agent selecting the wireless telephone number on a display being used by the agent.

15. A non-transitory, computer-readable medium comprising computer-executable instructions for ensuring compliance adherence for a call to be placed to a called party from a contact center using a wireless telephone number, the computer-executable instructions, when executed, are configured to cause at least one computer processor to:
   provide the wireless telephone number to an agent of the contact center prior to the agent originating the call to the called party;
   receive a query from a private branch exchange, in which the query was sent in response to the private branch exchange receiving an indication that the agent has originated the call to the called party by dialing the wireless telephone number using a phone device;
   determine whether the call is compliant with respect to at least one compliance requirement; and
   in response to determining the call is compliant, provide an authorization to the private branch exchange to place the call to the called party, wherein:
   upon receiving the authorization, the private branch exchange places the call to the called party by using the wireless telephone number and connects the call with the phone device being used by the agent of the contact center.

16. The non-transitory, computer-readable medium of claim 15, wherein the at least one compliance requirement comprises a maximum number of attempts to place the call to the called party over a particular time period.

17. The non-transitory, computer-readable medium of claim 15, wherein the computer-executable instructions, when executed, are further configured to cause the at least one computer processor to place a second call to a second called party using a telephone number in response to determining the telephone number is a wireline telephone number.

18. The non-transitory, computer-readable medium of claim 15, wherein the computer-executable instructions, when executed, are further configured to cause the at least one computer processor to receive a status of the call placed to the called party from the private branch exchange.

19. The non-transitory, computer-readable medium of claim 15, wherein the indication that the agent has originated the call comprises the agent manually dialing digits on the phone being used by the agent corresponding to the wireless telephone number.

20. The non-transitory, computer-readable medium of claim 19, wherein the computer-executable instructions, when executed, are further configured to cause the at least one computer processor to determine the digits dialed by the agent correspond to the wireless telephone number prior to providing the authorization to the private branch exchange.

21. The non-transitory, computer-readable medium of claim 15, wherein the indication that the agent has originated the call comprises the agent selecting the wireless telephone number on a display being used by the agent.

22. A system for ensuring compliance adherence for a call to be placed to a called party from a contact center using a wireless telephone number, the system comprising:
   a dialing device configured to:
      provide the wireless telephone number to an agent of the contact center prior to the agent originating the call to the called party;
   a private branch exchange configured to:
      send a query upon receiving an indication that the agent has originated the call to the called party by dialing the wireless telephone number using a phone device; and
   a compliance server configured to:
      receive the query;
      determine whether the call is compliant with respect to at least one compliance requirement; and
      in response to determining the call is compliant, provide an authorization to the private branch exchange to place the call to the called party, wherein:
      upon receiving the authorization from the compliance server, the private branch exchange places the call to the called party by using the wireless telephone number, connects the call with the phone device being used by the agent of the contact center, and provides the compliance server with a status of the call placed to the called party.

23. A method for ensuring compliance adherence for a call to be placed to a called party from a contact center using a wireless telephone number, the method comprising the steps of:
- providing the wireless telephone number to an agent of the contact center by a dialing device prior to the agent originating the call to the called party;
- sending a query from a private branch exchange upon receiving an indication that the agent has originated the call to the called party by dialing the wireless telephone number using a phone device;
- receiving the query by a compliance server;
- determining by the compliance server whether the call is compliant with respect to at least one compliance requirement;
- in response to determining the call is compliant, providing an authorization by the compliance server to the private branch exchange to place the call to the called party; and
- upon receiving the authorization from the compliance server:
  - placing the call by the private branch exchange to the called party by using the wireless telephone number;
  - connecting the call with the phone device being used by the agent of the contact center; and
  - providing the compliance server with a status of the call placed to the called party by the private branch exchange.

* * * * *